(12) United States Patent
Pons

(10) Patent No.: US 9,810,214 B2
(45) Date of Patent: *Nov. 7, 2017

(54) CALCULATING DOWNHOLE PUMP CARD WITH ITERATIONS ON DUAL DAMPING FACTORS

(71) Applicant: Victoria M. Pons, Katy, TX (US)

(72) Inventor: Victoria M. Pons, Katy, TX (US)

(73) Assignee: Weatherford Technology Holdings, LLC, Houston, TX (US)

(*) Notice: Subject to any disclaimer, the term of this patent is extended or adjusted under 35 U.S.C. 154(b) by 452 days.

This patent is subject to a terminal disclaimer.

(21) Appl. No.: 13/663,174

(22) Filed: Oct. 29, 2012

(65) Prior Publication Data

US 2013/0115107 A1 May 9, 2013

Related U.S. Application Data

(60) Provisional application No. 61/552,812, filed on Oct. 28, 2011, provisional application No. 61/598,438, (Continued)

(51) Int. Cl.
*F04B 49/06* (2006.01)
*E21B 43/12* (2006.01)
(Continued)

(52) U.S. Cl.
CPC .......... *F04B 49/065* (2013.01); *E21B 43/127* (2013.01); *E21B 47/0008* (2013.01);
(Continued)

(58) Field of Classification Search
CPC ...... F04B 49/065; F04B 47/022; F04B 49/20; F04B 51/00; F04B 2201/1211;
(Continued)

(56) References Cited

U.S. PATENT DOCUMENTS 3,343,409 A * 9/1967 Gibbs .................. 73/152.61
4,487,061 A * 12/1984 McTamaney .......... 73/152.61
(Continued)

FOREIGN PATENT DOCUMENTS

| RU | 7456 U1 | 6/2001 |
|---|---|---|
| RU | 2168653 C2 | 12/2007 |
| SU | 1731987 A1 | 5/1992 |

OTHER PUBLICATIONS

DaCunha, J.J. & Gibbs, S.G. "Modeling a Finite-Length Sucker Rod Using the Semi-Infinite-Wave Equation and a Proof of Gibbs' Conjecture" Society of Petroleum Engineers (2009).*

(Continued)

*Primary Examiner* — Jay B Hann
(74) *Attorney, Agent, or Firm* — Blank Rome LLP

(57) ABSTRACT

A pump apparatus has a downhole pump disposed in a wellbore and has a motor at the surface, and a rod string operatively moved by the motor reciprocates the downhole pump in the wellbore. Downhole data indicative of load and position of the downhole pump is generated using surface measurements and a wave equation model having an upstroke damping factor and a downstroke damping factor. Actual fluid load lines are determined from the downhole data for upstrokes and downstrokes of the downhole pump, and calculated fluid load lines for from the strokes are determined from the distribution of the load values in the downhole data. The actual fluid load lines are compared to the calculated fluid load lines to determine if the downhole card is over or under-damped. Then, at least one of the upstroke or downstroke damping factors of the wave equation model is adjusted so that new downhole data can be generated with appropriate damping.

46 Claims, 20 Drawing Sheets

Related U.S. Application Data filed on Feb. 14, 2012, provisional application No. 61/605,325, filed on Mar. 1, 2012, provisional application No. 61/706,489, filed on Sep. 27, 2012.

(51) Int. Cl.

| | | |
|---|---|---|
| *F04B 47/02* | (2006.01) | |
| *F04B 49/20* | (2006.01) | |
| *F04B 51/00* | (2006.01) | |
| *E21B 47/00* | (2012.01) | |
| *G05B 13/04* | (2006.01) | |

(52) U.S. Cl.
CPC ............ *F04B 47/022* (2013.01); *F04B 49/20* (2013.01); *F04B 51/00* (2013.01); *E21B 2043/125* (2013.01); *F04B 2201/121* (2013.01); *F04B 2201/1211* (2013.01); *G05B 13/042* (2013.01)

(58) Field of Classification Search
CPC ........... F04B 2201/121; E21B 47/0008; E21B 43/127; E21B 2043/125; G05B 13/042
See application file for complete search history.

(56) References Cited

U.S. PATENT DOCUMENTS

| | | | | |
|---|---|---|---|---|
| 4,490,094 | A | | 12/1984 | Gibbs |
| 5,252,031 | A | * | 10/1993 | Gibbs ............................. 417/18 |
| 5,423,224 | A | | 6/1995 | Paine |
| 5,464,058 | A | | 11/1995 | McCoy et al. |
| 6,857,474 | B2 | * | 2/2005 | Bramlett .................... 73/152.61 |
| 7,032,659 | B2 | | 4/2006 | Barnes et al. |
| 7,168,924 | B2 | * | 1/2007 | Beck ............................... 417/53 |
| 7,212,923 | B2 | * | 5/2007 | Gibbs ............................ 702/13 |
| 7,500,390 | B2 | | 3/2009 | Mills |
| 8,036,829 | B2 | * | 10/2011 | Gibbs .............................. 702/6 |
| 8,322,995 | B2 | * | 12/2012 | Ehimeakhe .................... 417/53 |
| 8,328,527 | B2 | * | 12/2012 | Ehimeakhe .................... 417/53 |
| 8,849,594 | B2 | * | 9/2014 | Mills ................... E21B 47/0008 702/1 |
| 2003/0065447 | A1 | | 4/2003 | Bramlett et al. |
| 2004/0062657 | A1 | | 4/2004 | Beck et al. |
| 2006/0149476 | A1 | | 7/2006 | Gibbs et al. |
| 2006/0251525 | A1 | | 11/2006 | Beck et al. |
| 2007/0286750 | A1 | | 12/2007 | Beck et al. |
| 2008/0240930 | A1 | * | 10/2008 | Palka ............................. 417/53 |
| 2010/0111716 | A1 | | 5/2010 | Gibbs et al. |
| 2011/0091332 | A1 | | 4/2011 | Ehimeakhe et al. |
| 2011/0091335 | A1 | | 4/2011 | Ehimeakhe et al. |

OTHER PUBLICATIONS

Miska, S., et al. "A Simple Model for Computer-Aided Optimization and Design of Sucker-Rod Pumping Systems" J. Petroleum Science & Engineering, vol. 17, pp. 303-312 (1997).*
Theta Enterprises, Inc. "XDIAG: Advanced Rod Pumping System Expert Diagnostic Analysis" 2nd ed. (1997).*
Everitt, T.A., et al. "An Improved Finite-Difference Calculation of Downhole Dynamometer Cards for Sucker-Rod Pumps" SPE Production Engineering, vol. 7, No. 1, pp. 121-127 (1992).*
International Search Report and Written Opinion received in counterpart PCT Appl. No. PCT/2012/062459 dated Jan. 15, 2013.
Everitt, T. A. and Jennings, J. W., "An Improved Finite-Difference Calculation of Downhole Dynamometer Cards for Sucker-Rod Pumps," SPE 18189, 1991.
Gibbs, S. G., "Design and Diagnosis of Deviated Rod-Pumped Wells", SPE 22787, 1992.
Lukasiewicz, S. A., "Dynamic Behavior of the Sucker Rod String in the Inclined Well", SPE 21665, 1991.
Lui, X. et al., "An Approach to the Design Calculation of Sucker Rod Pumping System in Coalbed Methane Wells," Chinese Journal of Mechanical Engineering, vol. 24, No. *, 2011.
Weatherford International, "ePIC Rod Pump Controller," Product Brochure, copyright 2008.
Weatherford International, "LOWIS: Life of Well Information Software," Product Brochure, copyright 2008.
Weatherford International, "Model 2000 Rod Pump Controller," Product Brochure, copyright 2008.
Weatherford International, "WellPilot Rod Pump Optimization Controller," Product Brochure, copyright 2010-2012.
International Search Report and Written Opinion received in counterpart PCT Appl. No. PCT/US2012/062463 dated Feb. 4, 2013.
Rosberg, "Well testing, methods and applicability", Engineering Geology Lund University, 2010. [Retreived on Dec. 21, 2012]. Retrieved from the internet:<URL:http://lup.lub.lu.se/luur/download? func=downloadFile&recordOld=1598933 &fileOld=1598935>.
Weidner, "Horsepowe to Drive a Pump", Phillips Electric 2003, pp. 1-6 [Retreived on Dec. 21, 2012]. Retrieved from the internet:,URL:http://www.phillipselectric.com/pdf/HP_Req_for_Pumps.pdf>.
First Office Action received in counterpart Canadian Appl. No. 2,857,144 dated Mar. 12, 2015.
Ehimeakhe, V., "Comparative Study of Downhole Cards Using Modified Everitt-Jennings Method and Gibbs Method", Southwestern Petroleum Short Course 2010.
Ehimeakhe, V., "Calculating Pump Fillage for Well Control using Transfer Point Location", SPE Eastern Regional Meeting, Oct. 12-14, 2010.
Gibbs, S. G., and Neely, A. B., "Computer Diagnosis of Down-Hole Conditions in Sucker Rod Pumping Wells," JPT (Jan. 1996) 91-98; Trans., AIME,237.
Gibbs, S. G., "A Review of Methods for Design and Analysis of Rod Pumping Installations," SPE 9980 presented at the 1982 SPE International Petroleum Exhibition and Technical Symposium, Beijing, Mar. 18-26.
Knapp, R. M., "A Dynamic Investigation of Sucker-Rod Pumping," MS thesis, U. of Kansas, Topeka (Jan. 1969).
Schafer, D. J. and Jennings, J. W., "An Investigation of Analytical and Numerical Sucker-Rod Pumping Mathematical Models," paper SPE 16919 presented at the 1987 SPE Annual Technical Conference and Exhibition, Sep. 27-30.
Ehimeakhe, V., "Modified Everitt-Jennings (MEJ) Method and the Gibbs Method: Downhole Card Comparison", 6th Annual Sucker Rod Pumping Workshop, Sep. 14-17, 2010.
First Office Action received in counterpart Australian Appl. No. 2012348346 dated May 12, 2015.
First Office Action received in counterpart Chinese Appl. No. 201280065229.2 dated Nov. 25, 2015.
First Office Action received in counterpart Russian Appl. No. 2014121401 dated Nov. 12, 2015.
Rowlan, L., "Unaccounted Sources of Friction that Lead to Sticking and Other Problems," 6th Annual Sucker Rod Pumping Workshop, Dallas, Texas, Sep. 14-17, 2010.
Rowlan, L., "Reference Loads for the Downhole Pump Card," 4th Annual Sucker Rod Pumping Workshop, Houston Texas, Sep. 9-12, 2008.
Supplementary European Search Report received in counterpart EP Appl. No. 12855283 dated May 31, 2016, 9-pgs.
Second Office Action received in counterpart Canadian Appl. No. 2857144 dated Jun. 16, 2016, 13-pgs.
Decision on Grant received in counterpart Russian Appl. No. 2014121401, dated Jun. 16, 2016, 19-pgs.

* cited by examiner (BACKGROUND)

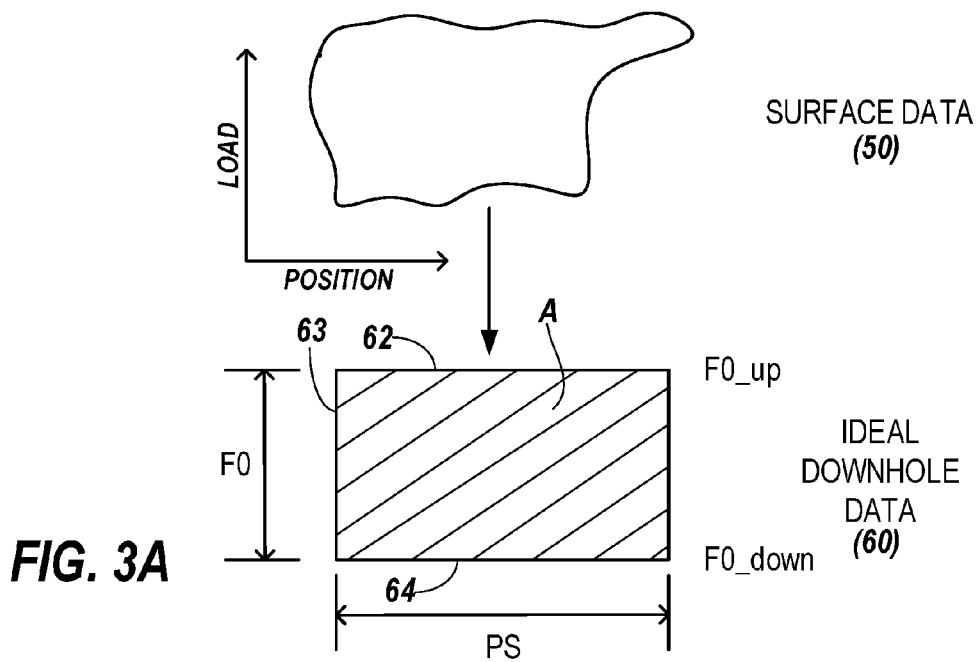
FIG. 3A
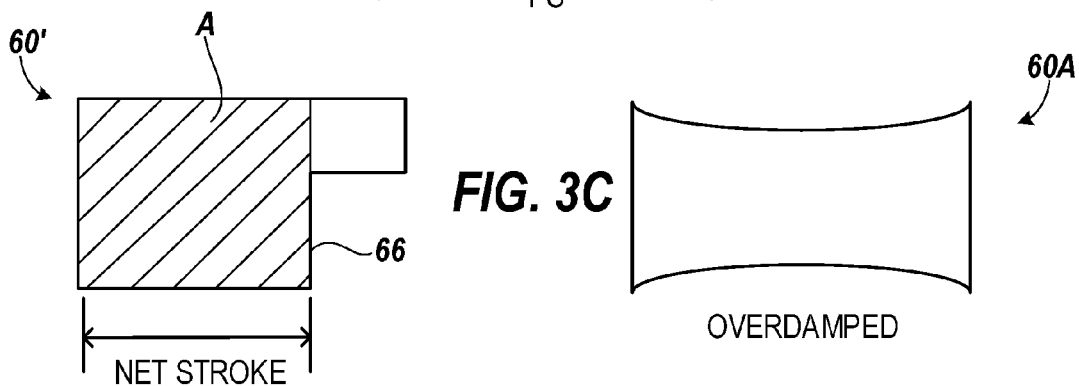
FIG. 3B
FIG. 3C
OVERDAMPED
FIG. 3D
UNDERDAMPED

CALCULATING DOWNHOLE PUMP CARD WITH ITERATIONS ON DUAL DAMPING FACTORS

CROSS-REFERENCE TO RELATED APPLICATIONS

This application claims the benefit of U.S. Patent Application Ser. No. 61/552,812 entitled "Modified Everitt-Jennings With Dual Iteration on the Damping Factors and Adaptation to Deviated Wells by Including Coulombs Friction" and filed 28 Oct. 2011; Ser. No. 61/598,438 entitled "Modified Everitt-Jennings With Dual Iteration on the Damping Factors" and filed 14 Feb. 2012; Ser. No. 61/605,325 entitled "Implementing Coulombs Friction for the Calculation of Downhole Cards in Deviated Wells" and filed 1 Mar. 2012; and Ser. No. 61/706,489 entitled "Iterating on Damping when Solving the Wave Equation and Computation of Fluid Load Lines and Concavity Testing" and filed 27 Sep. 2012, each of which is incorporated herein by reference in its entirety. This application is also filed concurrently with co-pending application Ser. No. 13/663,155 entitled "Calculating Downhole Cards in Deviated Wells," Ser. No. 13/663,161 entitled "Fluid Load Line Calculation and Concavity Test for Downhole Pump Card," Ser. No. 13/663,167 entitled "Calculating Downhole Pump Card With Iterations on Single Damping Factor," each of which is incorporated herein by reference in its entirety.

BACKGROUND OF THE DISCLOSURE

A. Sucker Rod Pump System

Reciprocating pump systems, such as sucker rod pump systems, extract fluids from a well and employ a downhole pump connected to a driving source at the surface. A rod string connects the surface driving force to the downhole pump in the wall. When operated, the driving source cyclically raises and lowers the downhole pump, and with each stroke, the downhole pump lifts well fluids toward the surface.

For example, FIG. 1 shows a sucker rod pump system 10 used to produce fluid from a well. A downhole pump 14 has a barrel 16 with a standing valve 24 located at the bottom. The standing valve 24 allows fluid to enter from the wellbore, but does not allow the fluid to leave. Inside the pump barrel 16, a plunger 20 has a traveling valve 22 located at the top. The traveling valve 22 allows fluid to move from below the plunger 20 to the production tubing 18 above, but does not allow fluid to return from the tubing 18 to the pump barrel 16 below the plunger 20. A driving source (e.g., a pump jack 11) at the surface connects by a rod string 12 to the plunger 20 and moves the plunger 20 up and down cyclically in upstrokes and downstrokes.

During the upstroke, the traveling valve 22 is closed, and any fluid above the plunger 20 in the production tubing 18 is lifted towards the surface. Meanwhile, the standing valve 24 opens and allows fluid to enter the pump barrel 16 from the wellbore. The highest point of the plunger's motion is typically referred to as the "top of stroke" (TOS), while the lowest point of the pump plunger's motion is typically referred to as the "bottom of stroke" (BOS).

At the TOS, the standing valve 24 closes and holds in the fluid that has entered the pump barrel 16. Additionally, at the TOS, the weight of the fluid in the production tubing 18 is supported by the traveling valve 22 in the plunger 20 and, therefore, also by the rod string 12, which causes the rod string 12 to stretch.

During the downstroke, the traveling valve 22 initially remains closed until the plunger 20 reaches the surface of the fluid in the barrel 16. Sufficient pressure builds up in the fluid below the traveling valve 22 to balance the pressure. The build-up of pressure in the pump barrel 16 reduces the load on the rod string 12 so that the rod string 12 relaxes.

This process takes place during a finite amount of time when the plunger 20 rests on the fluid, and the pump jack 11 at the surface allows the top of the rod string 12 to move downward. The position of the pump plunger 20 at this time is known as the "transfer point" because the load of the fluid column in the production tubing 18 is transferred from the traveling valve 22 to the standing valve 24. This results in a rapid decrease in load on the rod string 12 during the transfer.

After the pressure balances, the traveling valve 22 opens and the plunger 20 continues to move downward to its lowest position (i.e., the BOS). The movement of the plunger 20 from the transfer point to the BOS is known as the "fluid stroke" and is a measure of the amount of fluid lifted by the pump 14 on each stroke. In other words, the portion of the pump stroke below the transfer point may be interpreted as the percentage of the pump stroke containing fluid, and this percentage corresponds to the pump's fillage. Thus, the transfer point can be computed using a pump fillage calculation.

If there is sufficient fluid in the wellbore, the pump barrel 16 may be completely filled during an upstroke. Yet, under some conditions, the pump 14 may not be completely filled with fluid on the upstroke so there may be a void left between the fluid and the plunger 20 as it continues to rise. Operating the pump system 10 with only a partially filled pump barrel 16 is inefficient and, therefore, undesirable. In this instance, the well is said to be "pumped off," and the condition is known as "pounding," which can damage various components of the pump system. For a pumped off well, the transfer point most likely occurs after the TOS of the plunger 20.

Typically, there are no sensors to measure conditions at the downhole pump 14, which may be located thousands of feet underground. Instead, numerical methods are used calculate the position of the pump plunger 20 and the load acting on the plunger 20 from measurements of the position and load for the rod string 12 at the pump jack 11 located at the surface. These measurements are typically made at the top of the polished rod 28, which is a portion of the rod string 12 passing through a stuffing box 13 at the wellhead. A pump controller 26 is used for monitoring and controlling the pump system 10.

To efficiently control the reciprocating pump system 10 and avoid costly maintenance, a rod pump controller 26 can gather system data and adjust operating parameters of the system 10 accordingly. Typically, the rod pump controller 26 gathers system data such as load and rod string displacement by measuring these properties at the surface. While these surface-measured data provide useful diagnostic information, they may not provide an accurate representation of the same properties observed downhole at the pump. Because these downhole properties cannot be easily measured directly, they are typically calculated from the surface-measured properties.

Methods for determining the operational characteristics of the downhole pump 20 have used the shape of the graphical representation of the downhole data to compute various details. For example, U.S. Pat. No. 5,252,031 to Gibbs, entitled "Monitoring and Pump-Off Control with Downhole Pump Cards," teaches a method for monitoring a rod pumped well to detect various pump problems by utilizing measurements made at the surface to generate a downhole pump card. The graphically represented downhole pump card may then be used to detect the various pump problems and control the pumping unit. Other techniques for determining operational characteristics are disclosed in U.S. Patent Publication Nos. 2011/0091332 and 2011/0091335, which are both incorporated herein by reference in their entireties.

B. Everitt-Jennings Method

In techniques to determine operational characteristics of a sucker rod pump system 10 as noted above, software analysis computes downhole data (i.e., a pump card) using position and load data measured at the surface. The most accurate and popular of these methods is to compute the downhole card from the surface data by solving a one-dimensional damped wave equation, which uses surface position and load as recorded at the surface.

Various algorithms exist for solving the wave equation. Snyder solved the wave equation using a method of characteristics. See Snyder, W. E., "A Method for Computing Down-Hole Forces and Displacements in Oil Wells Pumped With Sucker Rods," Paper 851-37-K, 1963. Gibbs employed separation of variables and Fourier series in what can be termed the "Gibb's method." See Gibbs, S. G. et al., "Computer Diagnosis of Down-Hole Conditions in Sucker Rod Pumping Wells," JPT (Jan. 1996) 91-98; Trans., AIME, 237; Gibbs, S. G., "A Review of Methods for Design and Analysis of Rod Pumping Installations," SPE 9980, 1982; and U.S. Pat. No. 3,343,409.

In 1969, Knapp introduced finite differences to solve the wave equation. See Knapp, R. M., "A Dynamic Investigation of Sucker-Rod Pumping," MS thesis, U. of Kansas, Topeka (Jan. 1969). This is also the method used by Everitt and Jennings. See Everitt, T. A. and Jennings, J. W., "An Improved Finite-Difference Calculation of Downhole Dynamometer Cards for Sucker-Rod Pumps," SPE 18189, 1992; and Pons-Ehimeakhe, V., "Modified Everitt-Jennings Algorithm With Dual Iteration on the Damping Factors," 2012 South Western Petroleum Short Course. The Everitt-Jennings method has also been implemented and modified by Weatherford International. See Ehimeakhe, V., "Comparative Study of Downhole Cards Using Modified Everitt-Jennings Method and Gibbs Method," Southwestern Petroleum Short Course 2010.

To solve the one-dimensional wave equation, the Everitt-Jennings method uses finite differences. The rod string is divided into M finite difference nodes of length $L_i$ (ft), density $\rho_i$ (lbm/ft$^3$) and area $A_i$ (in$^2$). If we let u=u(x, t) be the displacement of position x at time t in a sucker rod pump system, the condensed one-dimensional wave equation reads:

$$v^2 \frac{\partial^2 u}{\partial x^2} = \frac{\partial^2 u}{\partial t^2} + D \frac{\partial u}{\partial t} \qquad (1)$$

where the acoustic velocity is given by:

$$v = \sqrt{\frac{144Eg}{\rho}}$$

and D represents a damping factor.

The first and second derivatives with respect to time are replaced by the first-order-correct forward differences and second-order-correct central differences. The second derivative with respect to position is replaced by a slightly rearranged second-order-correct central difference.

In the method, the damping factor D is automatically selected by using an iteration on the system's net stroke (NS) and the damping factor D. The damping factor D can be computed by the equation:

$$D = \frac{(550)(144g)}{\sqrt{2}\pi} \frac{(H_{PR} - H_H)\tau^2}{(\sum \rho_i A_i L_i)S^2} \qquad (2)$$

Where $H_{PR}$ is the polished rod horsepower (hp), S is the net stroke (in), $\tau$ is the period of one stroke (sec.), and $H_{HYD}$ is the hydraulic horsepower (hp) obtained as follows:

$$H_{HYD} = (7.36 \cdot 10^{-6}) Q \gamma F_l \qquad (3)$$

where Q is the pump production rate (B/D), $\gamma$ is the fluid specific gravity, and $F_l$ is the fluid level (ft). The pump production rate is given by:

$$Q = (0.1166)(SPM)Sd^2 \qquad (4)$$

where SPM is the speed of the pumping unit in strokes/minute, and d is the diameter of the plunger.

Additional details on the derivation of the damping factor D in equation (2) and the original iteration on the net stroke and damping factor algorithm are provided in Everitt, T. A. and Jennings, J. W., "An Improved Finite-Difference Calculation of Downhole Dynamometer Cards for Sucker-Rod Pumps," SPE 18189, 1992.

A modified Everitt-Jennings method also uses finite differences to solve the wave equation. As before, the rod string is discretized into M finite difference elements, and position and load (including stress) are computed at each increment down the wellbore. Then, as shown in FIG. 2, an iteration is performed on the net stroke and damping factor, which automatically selects a damping factor for each stroke.

The wave equation is initially solved to calculate the downhole card using surface measurements and an initial damping factor D set to 0.5 (Block 41). The initial net stroke $S_0$ is determined from the computed card, and the fluid level in the well is calculated (Block 44 42). At this point, a new damping factor D is calculated from equation (2) (Block 43) and so forth, and the downhole card is again computed with the new damping factor D (Block 44). Based on the recalculated downhole card, a new net stroke S is determined (Block 45).

At this point, a check is then made to determine whether the newly determined net stroke S is close within some tolerance C of the initial or previous net stroke (Decision 46). If not, then another iteration is needed, and the process 40 returns to calculating the damping factor D (Block 43). If the newly determined net stroke is close to the previously determined net stroke (yes at Decision 46), then the iteration for determining the net stroke can stop, and the process 40 continues on to iterate on the damping factor D using the converged net stroke S (Block 47). The downhole data is then calculated using the newly calculated damping factor D (Block 48), and the pump horsepower $H_{pump}$ is then calculated (Block 49a).

At this point, a check is made to see if the pump horsepower $H_{pump}$ is close within some tolerance to the hydraulic horsepower $H_{hyd}$ (Decision 49b). If so, then the process 40 ends as successfully calculating the downhole pump card with converged net stroke and damping factor D (Block 49c). If the pump horsepower $H_{pump}$ and the hydraulic horsepower $H_{hyd}$ are not close enough (no at Decision 49b), then the process 40 adjusts the current damping factor D by a ratio of the pump horsepower $H_{pump}$ and the hydraulic horsepower $H_{Hyd}$ (Block 49d). The process 40 of calculating the pump card with this adjusted damping factor D is repeated until the values for the pump and hydraulic horsepower $H_{pump}$ and $H_{Hyd}$ are close within the specified tolerance (Blocks 18 through 49d).

The advantage of the automatic iteration on the net stroke and the damping factor D as set forth above is that the damping factor D is adjusted automatically without human intervention. Thus, users managing a medium group to a large group of wells do not have to spend time manually adjusting the damping factor D as may be required by other methods.

C. Downhole Card and Damping

FIG. 3A shows exemplary surface data 50 obtained at the surface of the well. Load (y-axis) is graphed in relation to position (x-axis) as measured at the surface by a dynamometer system or the like. Using the techniques discussed previously, the measured surface data 50 can be mathematically translated to downhole data or pump card 60, which is shown ideally in this figure.

The pump card 60 has an upstroke fluid load line 62 ($F0_{up}$) and a downstroke fluid load line ($F0_{down}$). The height 63 of the pump card 60 is referred to as the fluid stroke F0, where F0=the upstroke fluid load line 62 ($F0_{up}$)—the downstroke fluid load line 64 ($F0_{down}$).

The pump or downhole stroke (PS) refers to the measure of extreme travel of the rod derived at the location of the pump. Thus, the "pump stroke" refers to the maximum displacement minus the minimum displacement and corresponds to the horizontal span or width of the downhole pump card 60.

Yet, the net stroke 68 (NS) refers to the measure of the portion of the pump stroke (PS) during which the fluid load is supported by the pump's standing valve. For a pumped off card 60' as shown in FIG. 3B, the net stroke 68 (NS) is measured relative to the transfer point 66, which is the displacement in the pump stroke where load is transferred from the pump's traveling valve to the standing valve. (The transfer point can be computed using a pump fillage calculation.) The transfer point 66 occurs because the pressure in the pump barrel has exceeded the pressure in the plunger. The portion of the stroke below (with lower displacement than) the transfer point 66 is the net stroke NS and is interpreted as the portion of the pump stroke (PS) that actually contains liquid.

The displacement and load data can be used to determine one or more characteristics of the downhole pump's operation, such as the minimum pump stroke, the maximum pump stroke, and the transfer point in the downhole stroke. In turn, the area A of the pump card 60 or 60' gives the pump horsepower of the downhole pump (20).

Using the wave equation as noted previously, the downhole pump card 60 is calculated from the surface data 50. The calculation requires that a damping factor D be used in the wave equation to add or remove energy from the calculation. If the calculation is over-damped as shown in FIG. 3C, then the downhole card 60A will be calculated with a shape as schematically shown. By contrast, if the calculation is under-damped, then the downhole card 60B will be calculated with a shape as schematically shown in FIG. 3D.

When analyzing surface data 50 and calculating the downhole card 60, the fluid load lines 62 and 64 represent the maximum and minimum loads applied to the rod string (12) by the pump (20) based on the current fluid level. When gas measurements are available, the fluid load lines 62 and 64 can be readily computed using the pump's intake pressure and the pump's discharge pressure. In the absence of these measurements, however, the fluid load lines 62 and 64 must be computed by other means.

In general, the fluid load lines 62 and 64 can be drawn on a graphical representation of the downhole card 60 because the fluid load lines 62 and 64 can generally be identified visually. When dealing with a large group of wells, however, any type of visual determination of fluid load lines 62 and 64 is highly impractical. Thus, because the fluid load lines 62 and 64 determine the fluid load used to compute the volumetric displacement of the pump (20) as well as fluid levels of the well, being able to determine fluid load lines 62 and 64 based on measured and calculated data can be quite useful for operating and diagnosing sucker rod pump systems.

BRIEF DESCRIPTION OF THE DRAWINGS

FIG. 3A shows the correlation between surface data obtained at the surface of the well to downhole data for a pump.
FIG. 3B shows the net stroke for a pumped off card.
FIG. 3C diagrams a downhole card that is over-damped.
FIG. 3D diagrams a downhole card that is under-damped.

DETAILED DESCRIPTION OF THE DISCLOSURE

A. Computation of Fluid Load Lines and Concavity Testing

As noted above, downhole data in a sucker rod pump system is either measured at the downhole pump or calculated from surface measured data using the wave equation. Knowledge of the downhole conditions is important for diagnosing and controlling the reciprocating system efficiently. For example, downhole data can help diagnose downhole conditions, calculate volumetric displacements, and compute efficiency of the pump system.

The teachings of the present disclosure provide a method for determining actual fluid load lines as well as calculated (representative) fluid load lines for a downhole pump card. The actual fluid load lines are the lines referred to in FIGS. 3A-3D, while the calculated fluid load lines depend on the load distribution of the pump card. Using these two lines, a concavity test can determine if the downhole card in question is under-damped or over-damped.

Figure 1:
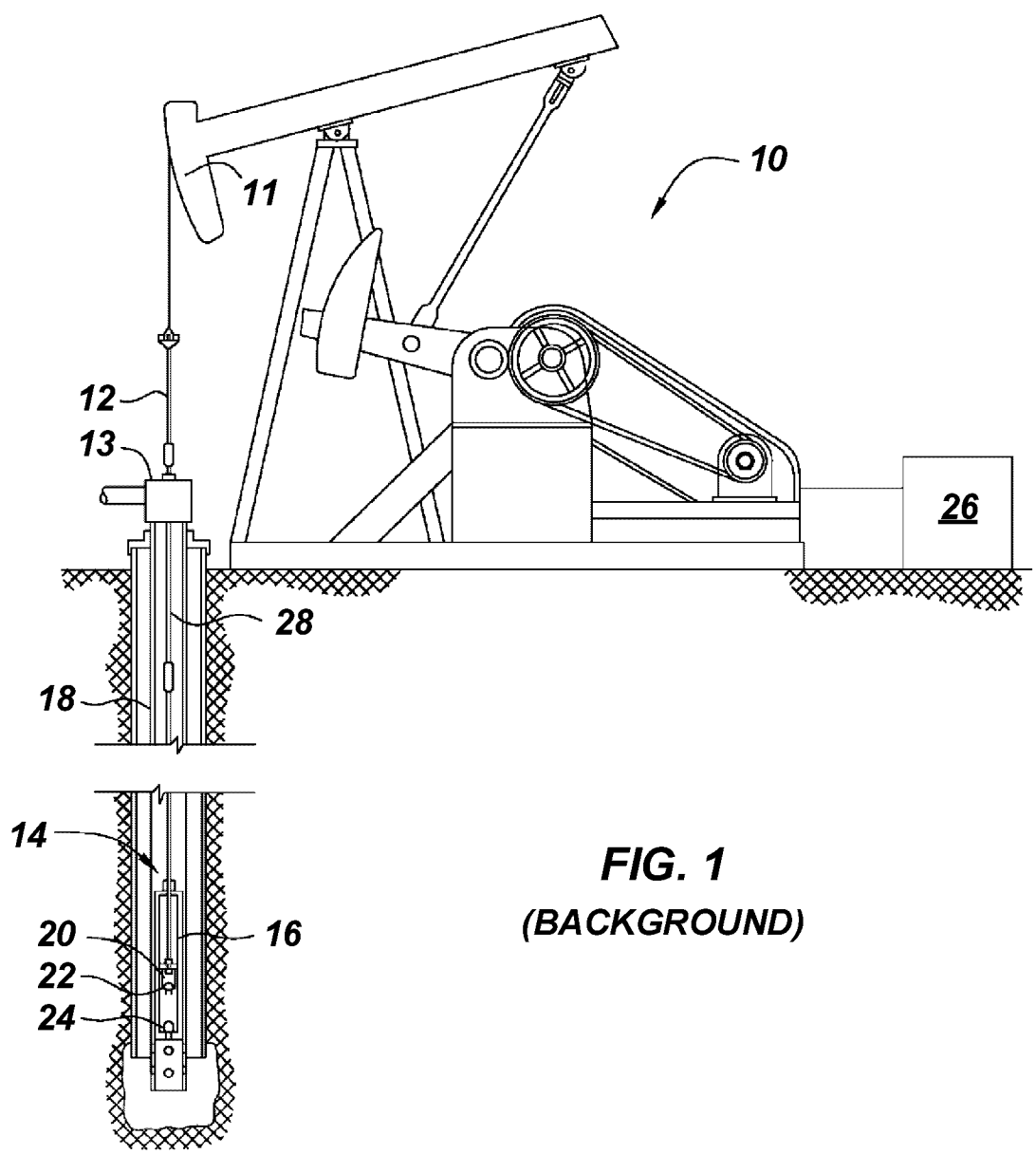
FIG. 1 illustrates a sucker rod pump system.
Figure 2:
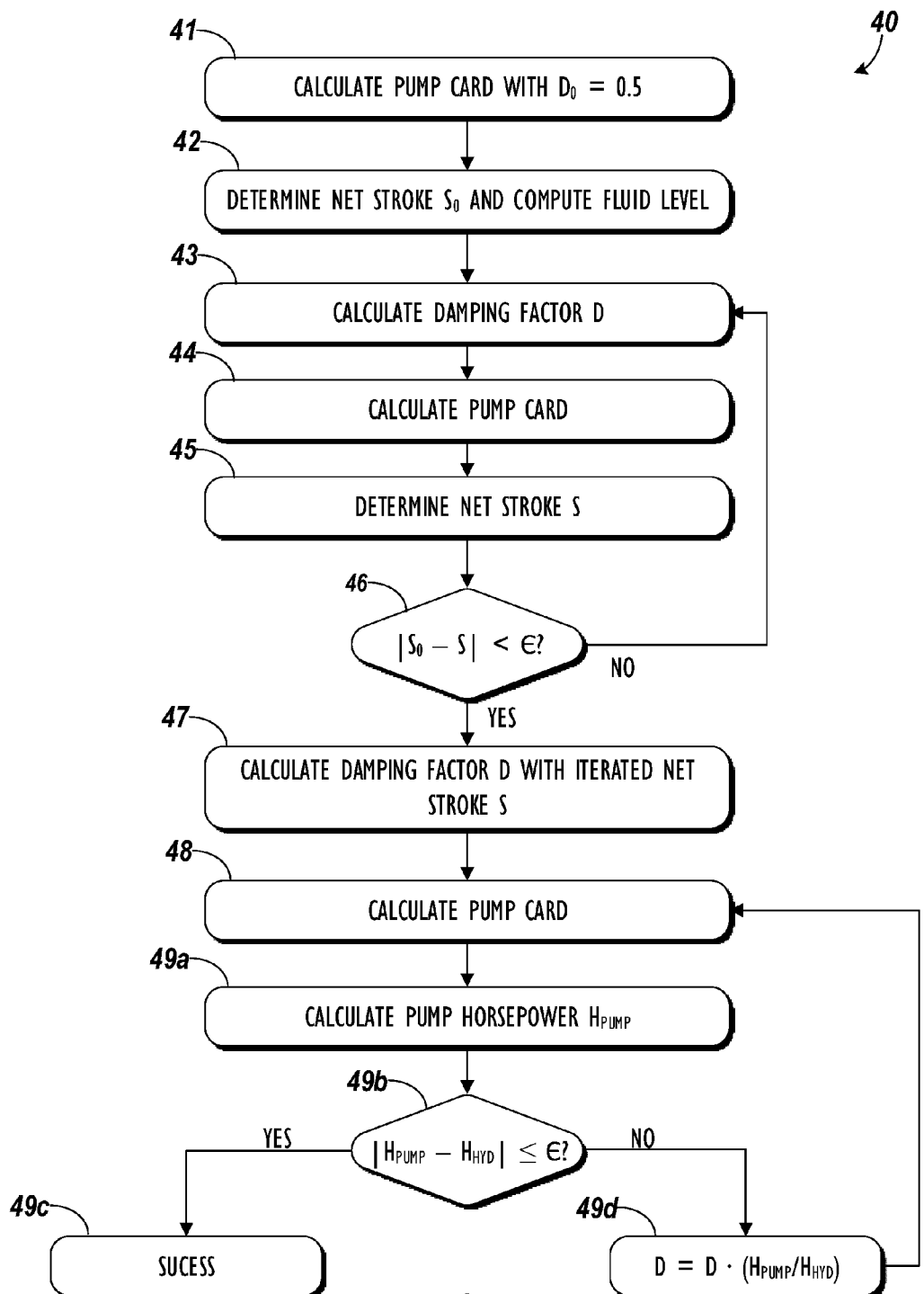
FIG. 2 illustrates iteration on net stroke and damping factor for the modified Everitt-Jennings algorithm to compute a pump card according to the prior art.
Figure 4:
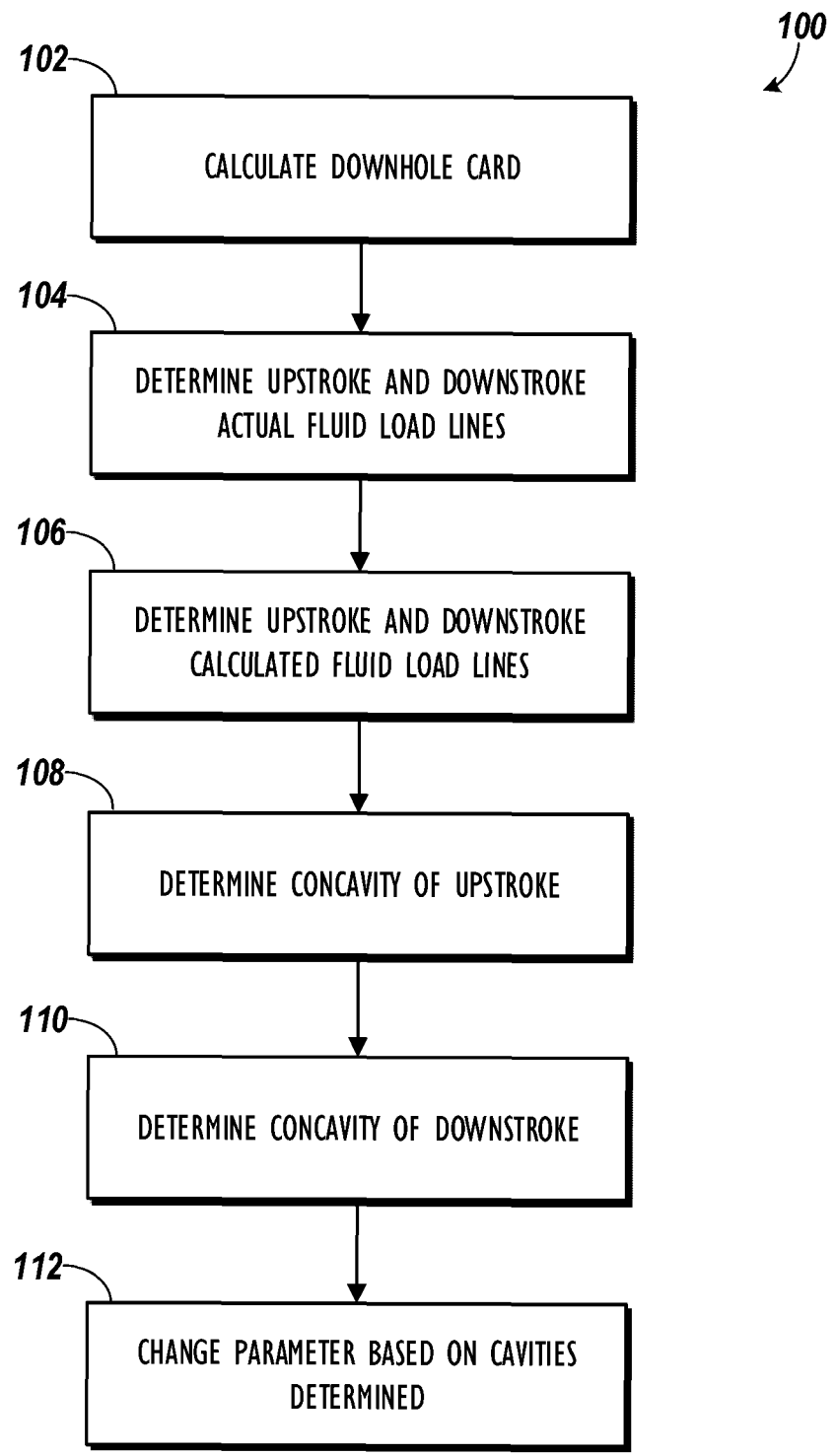
FIG. 4 is a flow chart for determining fluid load lines and determining the concavity of the fluid load lines according to the present disclosure.
Figure 5A:
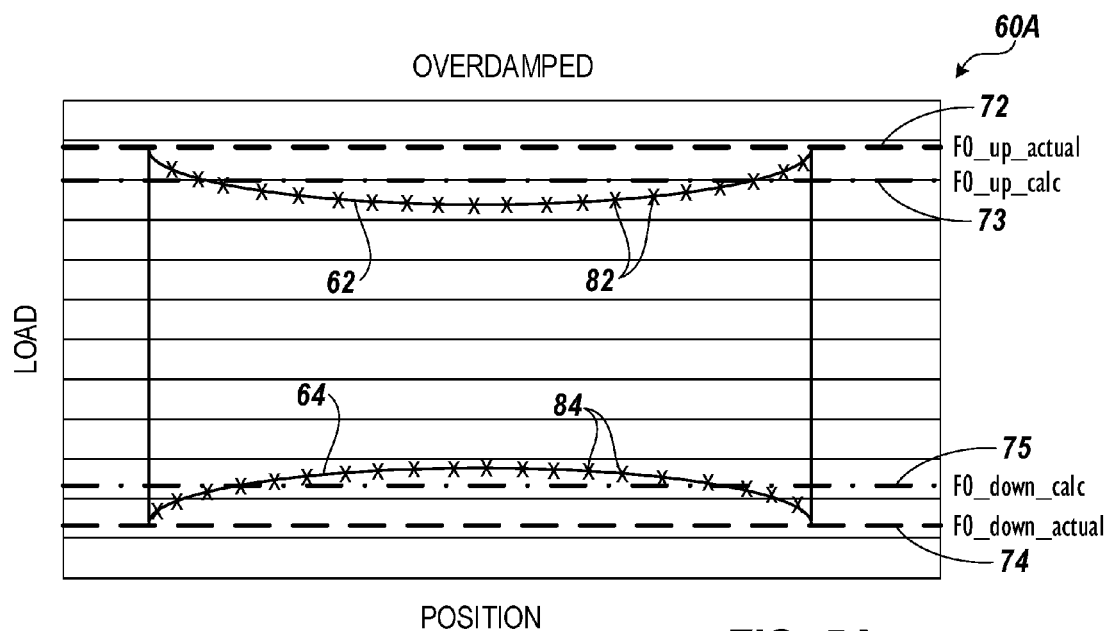
FIG. 5A shows fluid load lines being determined for an over-damped downhole card.
Figure 5B:
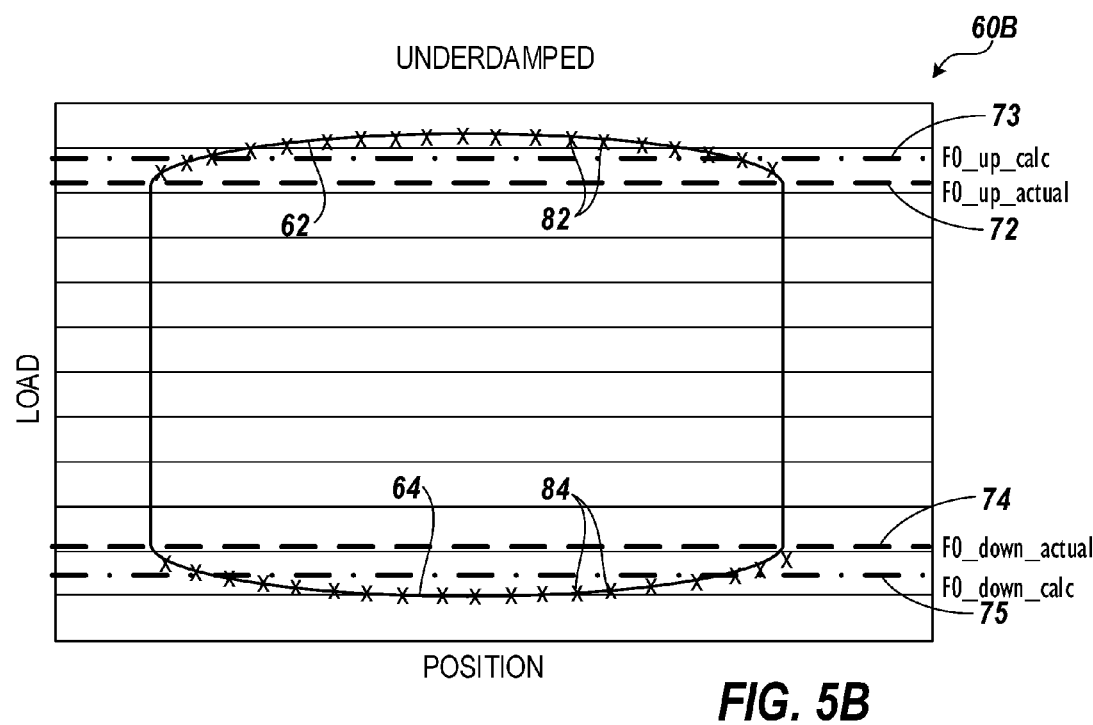
FIG. 5B shows fluid load lines being determined for an under-damped downhole card.

Turning to FIG. 4, a process 100 determines fluid load lines of a downhole pump card (e.g., 60A and 60B; FIGS. 5A-5B) and determines a concavity of the fluid load lines. In turn, these determinations can be used for the various purposes disclosed herein.

The process 100 begins by calculating the downhole card (e.g., 60A and 60B; FIGS. 5A-5B) using available techniques or more preferably the techniques disclosed herein (Block 102). The upstroke and downstroke actual fluid load lines are then determined from the downhole card (Block 104).

FIGS. 5A and 5B show representations of downhole cards—one card 60A is over-damped and another card 60B is under-damped for illustrative purposes. For the purposes of the present disclosure, the actual fluid load lines 72 and 74 are load lines that would typically be selected by a user. These fluid load lines 72 and 74 correspond to fluid load values disregarding any upstroke or downstroke friction and correspond to the pump intake pressure and the pump discharge pressure, respectively. The upstroke actual fluid load line 72 is referred to as $F0_{up}$actual, and the downstroke actual fluid load line 74 is referred to as $F0_{down}$actual.

Finding the upstroke and downstroke actual fluid load lines 72 and 74 involves locating the right hand corners of the graphical representation of the downhole card 60A or 60B. Although this can be done visually, it is done mathematically when processed by a pump controller or other processing device as disclosed herein. For example, the upstroke actual fluid load line 72 corresponds to the top of stroke, which is located by finding the zero of the first derivative of the pump's position downhole (i.e., finding when the velocity of the pump's movement is zero).

The downstroke actual fluid load line 74 corresponds to the lower right hand corner. Finding the lower right corner corresponds to finding the concave up point after the transfer point, which is the point at which the fluid load is transferred from the standing valve to the traveling valve in the downhole pump. Thus, the concave up point can be found by finding the absolute minimum of the second derivative of the pump's position downhole (i.e., finding the minimum acceleration after the transfer point). FIGS. 5A-5B show idealized downhole cards, but additional figures disclosed herein show actual fluid load lines calculated for exemplary data.

With the actual fluid load lines 72 and 74 determined in the process 100 of FIG. 4 (Block 104), the process 100 then determines calculated (representative) fluid load lines (Block 106). The calculated fluid load lines, which may also be referred to herein as representative fluid load lines, represent load values corresponding to the distribution of the upstroke and downstroke loads in the downhole data.

Determining the calculated fluid load lines can be done statistically, although other mathematical methods can be used. As shown in FIGS. 5A-5B, upstroke loads 82 are distributed along the upstroke fluid load lines 62 of the downhole cards 60A-B, and downstroke loads 84 are likewise distributed along the downstroke fluid load lines 64 of the downhole cards 60A-B.

The upstroke and downstroke loads 82 and 84 are statistically ordered by load ranges to produce probability density functions. The maximums of the probability functions yield the set of load ranges in which most of the upstroke and downstroke loads reside, respectively. In other words, the maximum of the probability density function for the upstroke loads is referred to as the upstroke calculated fluid load line $F0_{up}$calc, while the maximum of the probability density function for the downstroke loads is referred to as the downstroke calculated fluid load line $F0_{down}$calc.

For example, the upstroke and downstroke loads 82 and 84 are statistically ordered so that the loads 82 and 84 are grouped in load ranges, such as 0 to 100, 101 to 200, 201 to 300, etc., although any segments or ranges may be used. Partitioned in this way, the load range with the most load values 82 before the top of stroke in the upstroke corresponds to the upstroke calculated fluid load line 73 ($F0_{up}$calc). Similarly, the load range with the most load values 84 after the transfer point in the downstroke corresponds to the downstroke calculated fluid load line 75 ($F0_{down}$calc).

Thus, these load lines 73 and 75 represent in a sense the median values for the upstroke loads 72 and downstroke loads 74, respectively. Although statistical analysis for the load values in ranges has been described here to find the calculated fluid load lines 73 and 74, any other numerical method could be used, such as best fit line or linear interpolation. However, preferably as here, the techniques used are robust and do not require extensive computing power for a pump controller or other processing device.

By knowing the actual and calculated fluid load lines 72 & 73 and 74 & 75, parameters associated with the calculation of the downhole pump card 60A-B and associated with the diagnosis and control of the pump system (10) can be changed. This can achieve any of the various purposes disclosed herein, including adjusting the damping factor, stopping the pump system 10 periodically to allow more fluid to enter the wellbore, or controlling the speed of the pump system 10 so that it does not pump more fluid than enters the wellbore.

In particular, using both the actual and the calculated fluid load lines 72 & 73 and 74 & 75, the process 100 of FIG. 4 can also determine the concavity of the card's upstroke load line 62 (Block 108) and the concavity of the card's downstroke load line 64 (Block 110). By knowing the concavity of the load lines 62 and 64, parameters associated with the calculation of the downhole card 60A-B and associated with the diagnosis and control of the pump system 10 can be changed to achieve any of the various purposes disclosed herein.

For example, the actual and calculated fluid load lines computed 72 & 73 and 74 & 75 can indicate whether the downhole card is over-damped (e.g., 60A) or under-damped (e.g., 60B). As mentioned above, the actual fluid load lines 72 and 74 are the theoretical values where the fluid load lines of the card 60A-B should be. Thus, where the calculated fluid load lines 73 and 75 are located with respect to the actual fluid load lines 72 and 74 gives an indication of the state of damping in the wave equation used to calculate the downhole card. Ideally, the respective actual fluid load lines 72 and 74 and the calculated fluid load lines 73 and 75 are equal because this would mean that the pump horsepower (i.e., the area of the downhole pump card) is equal to the hydraulic horsepower (i.e., the fluid lifted).

By comparing the actual and calculated fluid load lines 72 & 73 and 74 & 75, the concavity of the load values in the downhole data 60A-B can be determined so that the damping used in the wave equation can be adjusted accordingly or so that some other purpose may be achieved as will be appreciated by one skilled in the art.

As shown in FIG. 5A where the upstroke calculated fluid load line 73 ($F0_{up}$calc) is less than the upstroke actual fluid load line 72 ($F0_{up}$actual), the downhole data may be determined as over-damped. Likewise in FIG. 5A, where the downstroke calculated fluid load line 75 ($F0_{down}$calc) is greater than the downstroke actual fluid load line 74 ($F0_{down}$actual), the downhole data may be determined as over-damped. A tolerance may be used in the comparison of the values for the fluid load lines that may depend on the particular implementation. Moreover, depending on the processing used, both conditions of the upstroke calculated fluid load line 73 being less than the upstroke actual fluid load line 72 and the downstroke calculated fluid load line 75 being greater than the downstroke actual fluid load line 74 may need to be true for the downhole data to be determined over-damped.

By contrast as shown in FIG. 5B where the upstroke calculated fluid load line 73 ($F0_{up}$calc) is greater than the upstroke actual fluid load line 72 ($F0_{up}$actual), the downhole data may be determined as under-damped. Likewise in FIG. 5B, where the downstroke calculated fluid load line 75 ($F0_{down}$calc) is less than the downstroke actual fluid load line 74 ($F0_{down}$actual), the downhole data may be determined as under-damped. Again, depending on the processing used, both conditions of the upstroke calculated fluid load line 73 being greater than the upstroke actual fluid load line 72 and the downstroke calculated fluid load line 75 being less than the downstroke actual fluid load line 74 may need to be true for the downhole data to be determined under-damped.

Knowing the relationship of the actual and calculated fluid load lines 72 & 73 and 74 & 75 and whether the data is over or under damped, any damping factor used in the wave equation calculation of the surface data can be appropriately adjusted so that the downhole card 60 will more appropriately represent actual conditions downhole. Additionally, knowing the relationship of the actual and calculated fluid load lines 72 & 73 and 74 & 75 can be used for other purposes.

Additional details related to calculating the fluid load lines and testing their concavity can be found in co-pending U.S. application Ser. No. 13/663,161 entitled "Fluid Load Line Calculation and Concavity Test for Downhole Pump Card" filed concurrently herewith, which is incorporated herein by reference in its entirety.

B. Modified Everitt-Jennings with Iteration on Damping Factor

The teachings of the present disclosure modify the Everitt-Jennings algorithm when solving the wave-equation and computing a downhole pump card by incorporating a fluid level calculation with a fluid load line calculation and a concavity test to improve the accuracy and convergence of the Everitt-Jennings algorithm.

When calculating downhole data using the wave equation, it is important to handle damping properly. In the modified Everitt-Jennings method, finite differences are used to solve the wave equation, and position and load, including stress, are computed at each increment down the wellbore. The damping factor D in the wave equation relies on the net stroke and the hydraulic horsepower, both of which are unknown or approximated at the beginning of the calculation. The hydraulic horsepower is a factor of the fluid level, which reflects the amount of fluid in the wellbore annulus. Therefore, unless calculated for that particular stroke, the fluid level may be highly inaccurate.

In the present techniques, iteration on the net stroke and the damping factor is modified to incorporate a fluid level calculation and to include an initialization step of the variables needed for the iteration. The iteration on damping is further modified to treat either one damping factor or separate upstroke and downstroke damping factors.

In one embodiment, an iteration is performed on a single damping factor when solving the wave equation and computing downhole data. The iteration calculates actual fluid load lines and calculated (representative) fluid load lines and performs a concavity test of the downhole data. As detailed above, the actual fluid load lines are computed using calculus and the first and second derivative of the downhole position data. The calculated fluid load lines are computed using a statistical analysis of the downhole load data. The concavity test is a step by step comparison of those two sets of lines. The addition of the concavity test improves the speed and accuracy of convergence when iterating on the damping factor by providing better convergence criteria.

In another embodiment, an iteration is performed on dual damping factors when solving the wave equation and computing downhole data. The dual damping factors include separate upstroke and downstroke damping factors. Conditions can be very different between the upstroke and downstroke, mainly due to the direction of the fluid flowing with or against the rods. Thus, the process splits and iterates on upstroke and downstroke damping factors separately. The iteration on the dual damping factors combines a two-step process for damping factor modification.

1. Iteration on Single Damping Factor

Figure 6A:
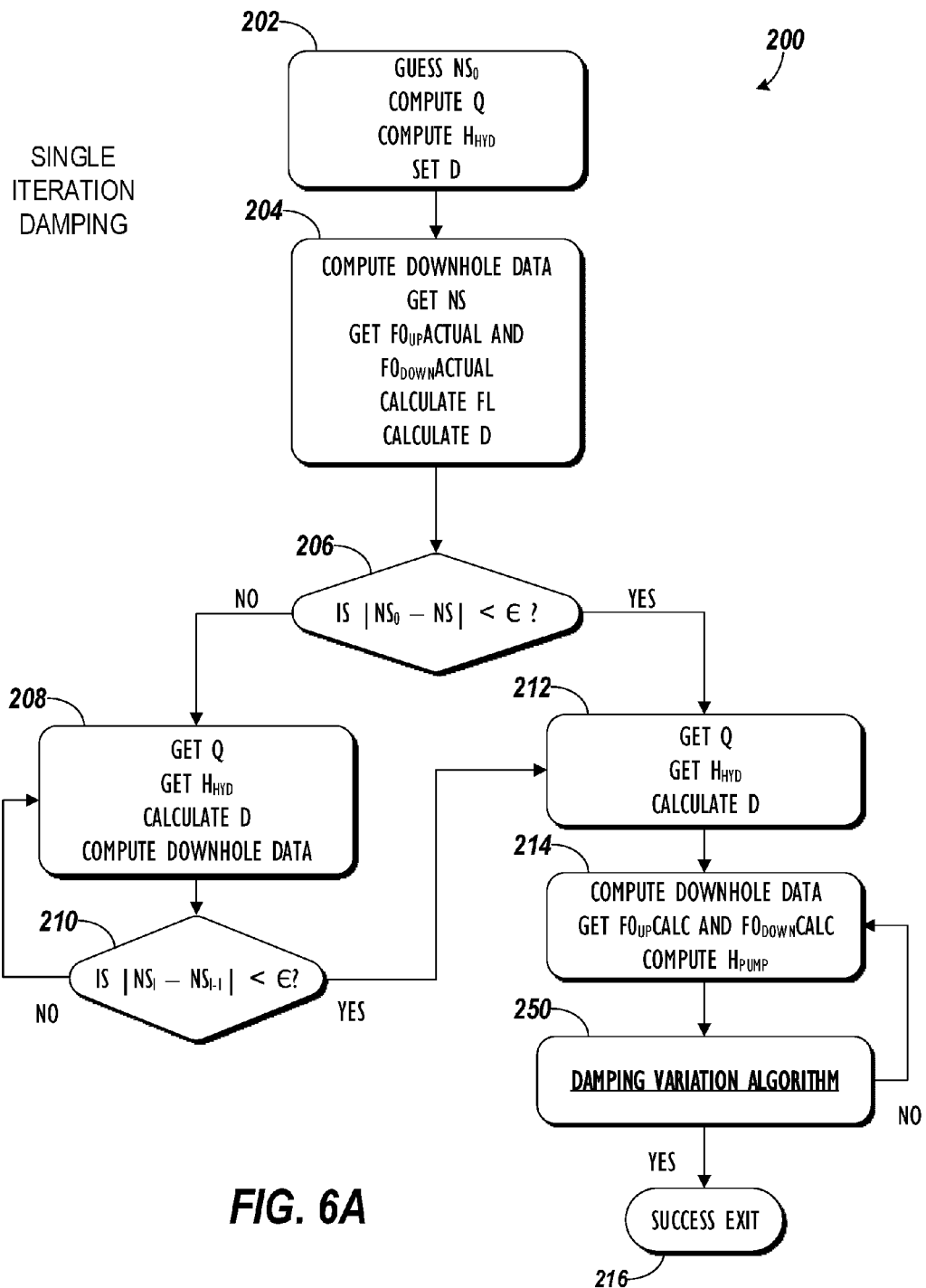
FIG. 6A is a flow chart for computing a downhole card by iterating on a single damping factor according to one technique of the present disclosure.

Turning to FIG. 6A, a process 200 according to one technique of the present disclosure computes a downhole card by iterating first on the net stoke and then iterating on a single damping factor. In the process 200, some initial calculations and steps are performed (Block 202). An initial net stroke ($NS_0$) and top of stroke (TOS) are selected. This allows a daily production rate (Q) and hydraulic horsepower ($H_{hyd}$) to be computed. The damping factor D is then set to an initial value, e.g., D=0.5.

Having these initial values, a number of subsequent calculations are performed (Block 204). In particular, the surface data is computed to produce an initial downhole pump card based on the set damping factor D and the guessed net stroke ($NS_0$) and top of stroke (TOS) using the wave equation model disclosed herein. Form the downhole card, the actual fluid load lines ($F0_{up}$actual, $F0_{down}$actual) and the net stroke (NS) are obtained, and the fluid level (FL), and a new damping factor D is calculated from equation (2).

At this point after initial assumptions have been corrected and a new damping D factor calculated, a check is made to determine if the calculated net stroke (NS) is within a given tolerance to the initially guessed net stroke ($NS_0$). In particular, the process 200 determines whether the absolute value of the difference between the guessed net stroke ($NS_0$) and the calculated net stroke (NS) is within a tolerance C (Decision 206). (The actual tolerance C for the difference can vary and can depend on the particular implementation, well, load levels, type of pump, etc.) If the net stroke has converged, the process 200 proceeds to iterate on the new damping factor D (Block 212). Otherwise, the process 200 continues iterating on the net stroke (NS) (Block 208).

To continue iterating on the net stroke (NS), the process 200 calculates the daily production rate (Q), the hydraulic horsepower ($H_{hyd}$), a new damping factor (D), and the downhole card again using the computed net stroke (NS) (Block 208). Again, a check is made whether the absolute value of the difference between the previous net stroke ($NS_{I-1}$) and the new net stroke ($NS_I$) is within tolerance C (Decision 210), and the process 200 either reverts back to iterate on the net stroke (NS) (Block 208) or proceeds to iterate on the damping factor D (Block 212).

To iterate on the damping factor D once the net stroke (NS) has converged, the process 200 calculates the daily production rate (Q), the hydraulic horsepower ($H_{hyd}$), and a new damping factor D based on the computed net stroke (NS) (Block 212). Then, the downhole pump card is calculated using the wave equation model as disclosed herein, and the calculated fluid load lines ($F0_{up}$calc, $F0_{down}$calc) and the pump horsepower ($H_{pump}$) are computed (Block 212). The calculated fluid load lines ($F0_{up}$calc, $F0_{down}$calc) are calculated using the techniques discussed above. The pump horsepower ($H_{pump}$) is computed from the area of the downhole pump card.

At this point, the process 200 enters a damping variation algorithm 250 (FIG. 6B) that compares the hydraulic horsepower ($H_{hyd}$) with the pump horsepower ($H_{pump}$). If the comparison 250 is successful, the process exits as successfully iterating on the damping factor D to characterize the pump's operation (Block 216); otherwise, the process 200 again computes the downhole card (Block 214) so another iteration on the damping factor D can be completed.

Figure 6B:
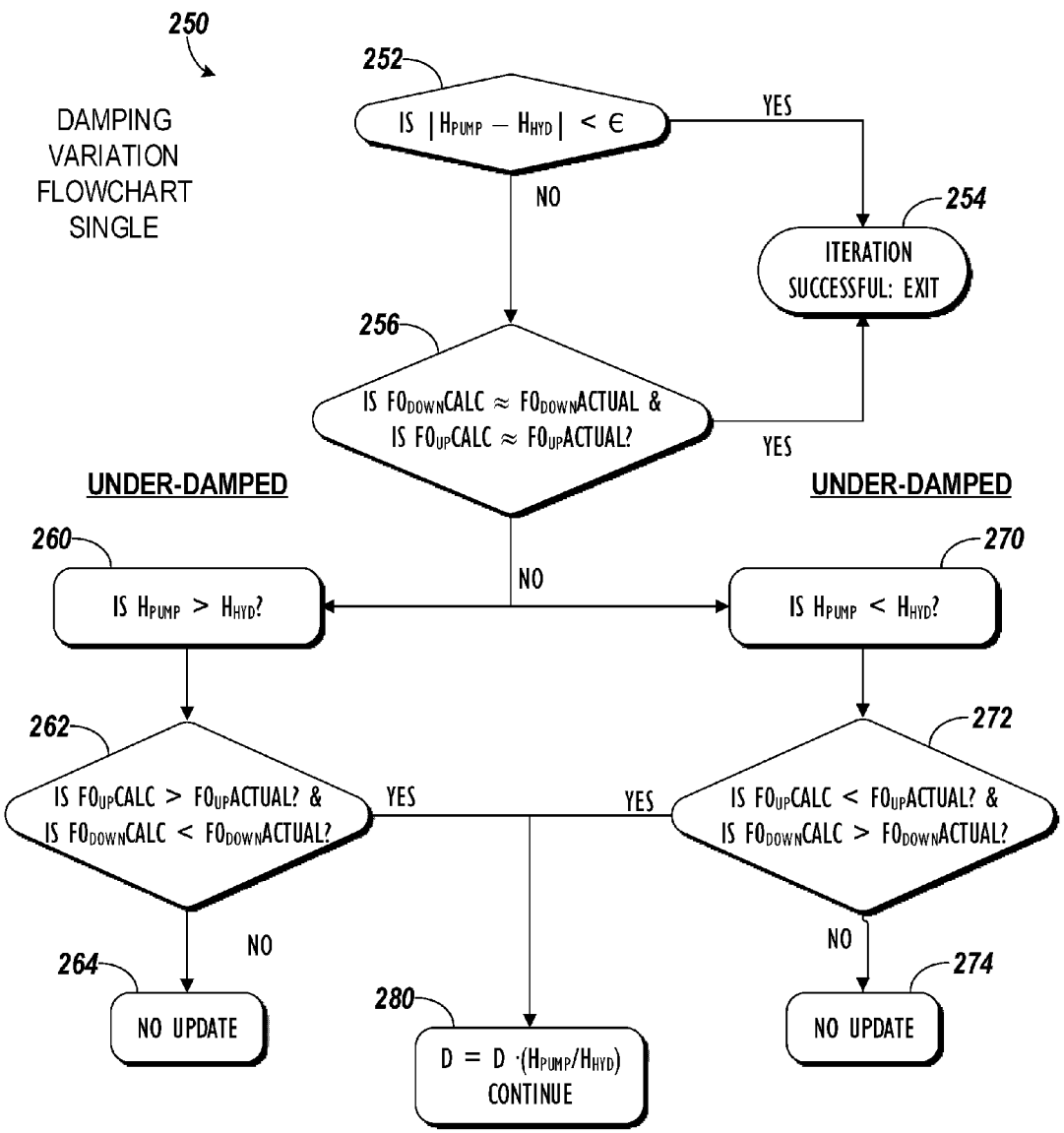
FIG. 6B is a flow chart for determining the damping variation for the iteration on the single damping factor in FIG. 6A.

Turning to the damping variation algorithm in more detail, a comparative process 250 in FIG. 6B determines the damping variation for the iteration on the single damping factor D in FIG. 6A. This comparative process 250 serves as a test of the concavity of the fluid load lines in the downhole pump card, which indicates whether the downhole pump card is over-damped or under-damped.

In the comparative process 250, the direction of the variation on the damping factor D is determined by the sign of the difference between the pump horsepower ($H_{pump}$) and the hydraulic horsepower ($H_{hyd}$). If the pump horsepower ($H_{pump}$) is greater than the hydraulic horsepower ($H_{hyd}$), the downhole card is deemed to be under-damped. Consequently, the damping factor D needs to be increased. Similarly, if the pump horsepower ($H_{pump}$) is less than the hydraulic horsepower ($H_{hyd}$), the downhole card is deemed to be over-damped, and the damping factor D needs to be decreased.

To determine if and to what extent to change in the damping factor D, the comparative process 250 in FIG. 6B initially determines whether the pump horsepower ($H_{pump}$) is within tolerance of the hydraulic horsepower ($H_{hyd}$) (Decision 252). If so, the iteration is successful and exits (Block 254) because the amount of damping used in the calculating of the downhole pump card is sufficient.

If these horsepowers are not within tolerance, however, the process 250 continues with a secondary comparison (Decision 256). Here, the process 250 determines whether the calculated downstroke fluid load line ($F0_{down}$calc) is within a given range of the actual downstroke fluid load line ($F0_{down}$actual) and whether the calculated upstroke fluid load line ($F0_{up}$calc) is within a given range of the actual upstroke fluid load line ($F0_{up}$actual). The range can vary and can depend on the particular implementation, such as the fluid load levels, type of downhole pump, etc. In general, the given ranges are selected to determine whether the actual and calculated fluid load lines for the upstroke and downstroke are essentially equivalent to one another.

If both the actual and calculated fluid load lines for the upstroke and downstroke are essentially equivalent, the iteration is successful and exits (Block 254) because no adjustment of the damping factor D is needed. If not, then the process 250 proceeds to one stage (Block 260) or another stage (Block 270) depending on whether the pump horsepower ($H_{pump}$) is greater or less than the hydraulic horsepower ($H_{hyd}$).

As noted above, the set of actual fluid load lines ($F0_{up}$actual and $F0_{down}$actual) are calculated by finding the right hand corners of the downhole pump card. The set of calculated fluid load lines ($F0_{up}$calc and $F0_{down}$calc) are calculated using statistics or other technique as disclosed herein. When comparing the position of these fluid load lines, it becomes possible to determine how little or how much damping is needed. Therefore, the fluid load line calculations and the concavity test disclosed above is made part of the convergence criteria for the damping factor D as will be detailed below.

If the pump horsepower ($H_{pump}$) is greater than the hydraulic horsepower ($H_{hyd}$) indicative of under-damping (Block 260), two analyses are made: (1) Is the calculated upstroke fluid load line ($F0_{up}$calc) greater than the actual upstroke fluid load line ($F0_{up}$actual)? and (2) Is the calculated downstroke fluid load line ($F0_{down}$calc) less than the actual downstroke fluid load ($F0_{down}$actual)? (Decision 262) If both are true, then the process 250 updates the damping factor D because the downhole pump card is essentially under-damped (See e.g., FIG. 5B) (Block 250). If not, no update may be necessary because any over or under-damping of the downhole pump card may be inconclusive, although additional adjustment of the damping factor D can be performed (Block 264).

Similarly, if the pump horsepower ($H_{pump}$) is less than the hydraulic horsepower ($H_{hyd}$) (Block 270), two analyses are also made: (1) Is the calculated upstroke fluid load line ($F0_{up}$calc) less than the actual upstroke fluid load ($F0_{up}$actual)? and (2) Is the calculated downstroke fluid load line ($F0_{down}$calc) greater than the actual downstroke fluid load line ($F0_{down}$actual)|? (Decision 272). If both are true, then the process 250 updates the damping factor because the downhole pump card is essentially over-damped (See e.g., FIG. 5A) (Block 280). If not, no update may be necessary because any over or under-damping of the downhole pump card may be inconclusive, although additional adjustment of the damping factor D can be performed (Block 274).

As shown here, the update of the damping factor D (Block 280) is based on a ratio of the pump horsepower ($H_{pump}$) to the hydraulic horsepower ($H_{hyd}$), which scales the previous value for the damping factor D used in calculating the downhole pump card. When no update is necessary (Blocks 264 & 274), the damping variation algorithm 250 returns to the iterative process 200 in FIG. 6A with the existing damping factor unadjusted so the process 200 ends successfully (Block 216; FIG. 6A). When an update is necessary (Blocks 280), the damping variation algorithm 250 returns to the iterative process 200 in FIG. 6A with the existing damping factor adjusted by the horsepower ratio so the process 200 does another iteration with the adjusted damping factor (Block 214; FIG. 6A).

2. Iteration on Dual Damping Factors

As disclosed above, finite differences and an iteration on the damping factor D are used to solve the one-dimensional damped wave equation to calculate downhole pump card. The process assumes that the friction due to viscous forces can be grouped into only one common coefficient D for the upstroke and the downstroke. As noted herein, however, it is possible for damping to be differentiated between the upstroke and downstroke. Therefore, separate upstroke and downstroke damping factors are preferably used as detailed below.

In the current technique, upstroke and downstroke damping factors $D_{up}$ and $D_{down}$ are split and iterated on separately. The iteration on the dual damping factors $D_{up}$ and $D_{down}$ combines a two-step process for damping factor modification to select the values for the damping factors accurately. The original damping factor is preferably split into upstroke and downstroke damping factors $D_{up}$ and $D_{down}$ because the upstroke and downstroke damping can be very different. On the downstroke, for example, the rods of the rod string move against the fluids in the well, while on the upstroke, the rods move with the fluids. Therefore, allocating separate damping factors $D_{up}$ and $D_{down}$ for the upstroke and the downstroke can account for these differences.

For each stroke, the top of stroke (TOS) is calculated. As defined, the top of stroke is the turning point at which the upward movement of the pump system stops and the downstroke begins, making it the delimiting factor between the downstroke and upstroke. The top of stroke is computed by calculating the zero of the first derivative of the displacement u=u(x, t), i.e., the point where the velocity is 0. Additional details on the computation of the top of stroke (TOS) as well as other useful calculations (e.g., transfer point, pump fillage, etc.) can be found in U.S. Patent Publication Nos. 2011/0091332 and 2011/0091335, which are incorporated herein by reference in their entireties.

Knowing the top of stroke (TOS), the modified Everitt-Jennings finite difference algorithm is changed to treat the two damping factors $D_{up}$ and $D_{down}$ as follows:

Initialization: For timesteps j=1, . . . , N, the surface displacement at the initial node 0 is given as: $u_{0,j}=g_{PR,j}$.

From Hooke's law: For timesteps j=1, . . . , N, the surface displacement at the next node 1 is given as:

$$u_{1,j} = \frac{f_{PR,j} \cdot \Delta x}{EA} + u_{0,j},$$

where $f_{PR}$ is the dynamic polished rod load (i.e., the surface-recorded load minus the buoyed weight of the rods).

For the subsequent nodes along the rod string i=2, . . . , M:

For the upstroke timesteps j=1, . . . , TOS, the finite-difference analog for the upstroke displacement along the rod string is given as:

$$u_{i+1,j} = \frac{1}{\left(\frac{EA}{\Delta x}\right)^+} \quad (5)$$

$$\left\{ [\alpha(1+D_{up}\Delta t)] \cdot u_{i,j+1} - \left[\alpha(2+D_{up}\Delta t) - \left(\frac{EA}{\Delta x}\right)^+ - \left(\frac{EA}{\Delta x}\right)^-\right] \cdot u_{i,j} + \alpha \cdot u_{i,j-1} - \left(\frac{EA}{\Delta x}\right)^- \cdot u_{i-1,j} \right\},$$

For the downstroke timesteps j=TOS+1, . . . , N, the finite-difference analog for the downstroke displacement along the rod string is given as:

$$u_{i+1,j} = \frac{1}{\left(\frac{EA}{\Delta x}\right)^+} \quad (6)$$

$$\left\{ [\alpha(1+D_{down}\Delta t)] \cdot u_{i,j+1} - \left[\alpha(2+D_{down}\Delta t) - \left(\frac{EA}{\Delta x}\right)^+ - \left(\frac{EA}{\Delta x}\right)^-\right] \cdot u_{i,j} + \alpha \cdot u_{i,j-1} - \left(\frac{EA}{\Delta x}\right)^- \cdot u_{i-1,j} \right\},$$

where $$\alpha = \frac{\overline{\Delta x}}{\Delta t^2}\left[\frac{\left(\frac{\rho A}{144g}\right)^+ + \left(\frac{\rho A}{144g}\right)^-}{2}\right]$$

and $$\overline{\Delta x} = \frac{1}{2}(\Delta x^+ + \Delta x^-).$$

At the downhole pump:

For the upstroke timesteps j=1, . . . , TOS, the pump displacement is given as:

$$u_{pump,j}=(1+D_{up}\Delta t)\cdot u_{M-1,j+1}-D_{up}\Delta t \cdot u_{M-1,j}+u_{M-1,j-1}-u_{M-1,j}, \quad (7)$$

For the downstroke timesteps j=TOS+1, . . . , N, the pump displacement is given as:

$$u_{pump,j}=(1+D_{down}\Delta t)\cdot u_{M-1,j+1}-D_{down}\Delta t \cdot u_{M-1,j}+u_{M-1,j-1}-u_{M-1,j}, \quad (8)$$

For the entire stroke timesteps j=1, . . . , N, the pump load based on Hooke's law is given as:

$$F_{pump,j} = \frac{EA}{2\Delta x}(3u_{M,j} - 4u_{M-1,j} + u_{M-2,j}).$$

In equation (5-8), the upstroke damping factor $D_{up}$ is used for the timesteps j=1, . . . , TOS, while the downstroke damping factor $D_{down}$ is used for the timesteps j=TOS+1, . . . , N.

Figure 7A:
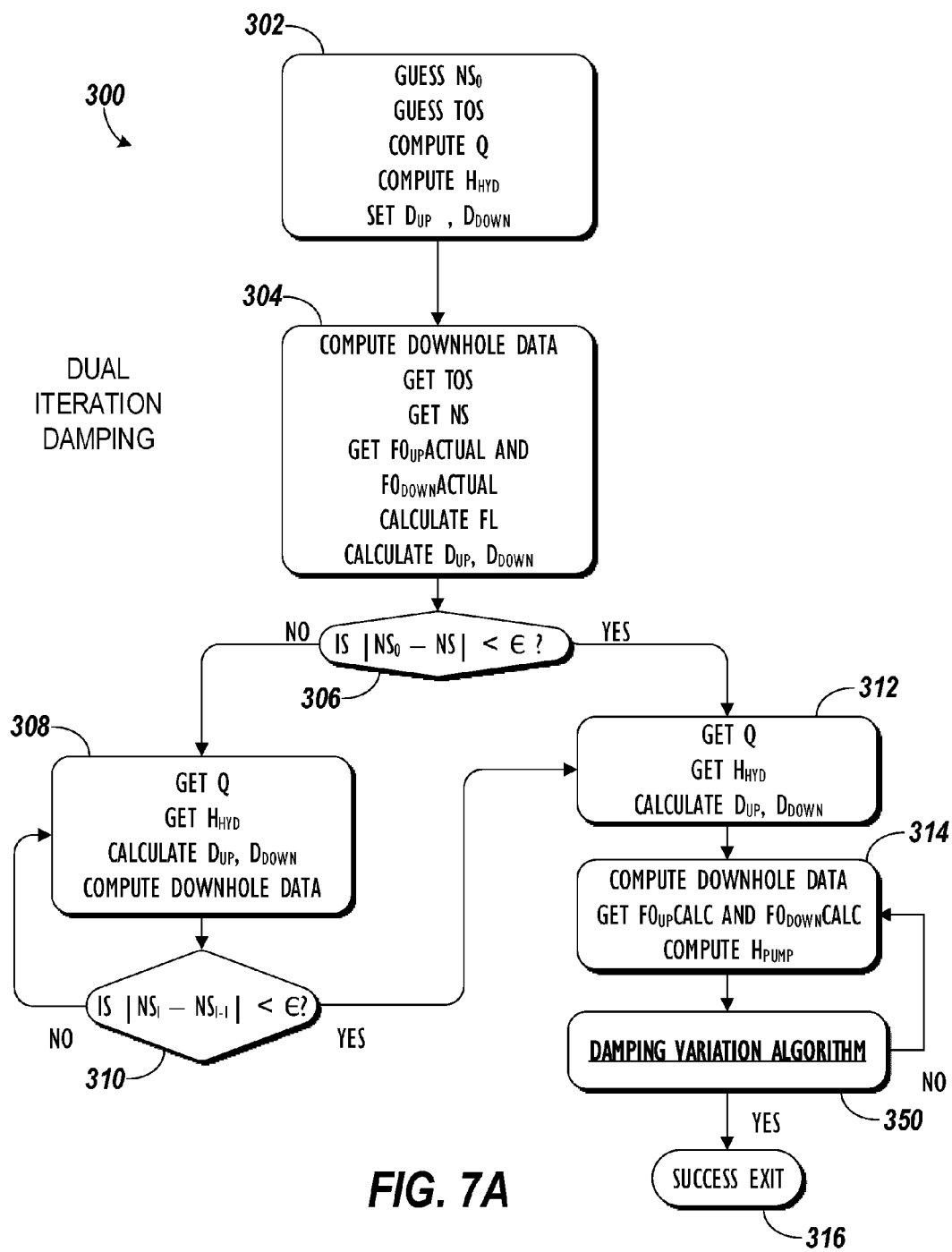
FIG. 7A is a flow chart for computing a downhole card by iterating on dual damping factors according to another technique of the present disclosure.

With understanding of the split between the upstroke and downstroke damping factors $D_{up}$ and $D_{down}$, we now turn to a process 300 for iterating on the dual damping factors until convergence as shown in FIG. 7A.

The iteration on the dual damping factors $D_{up}$ and $D_{down}$ is composed of two parts. Similar to the modified iteration on the single damping factor, the iteration on the net stroke (NS) and the iteration on the dual damping factors $D_{up}$ and $D_{down}$ are treated separately. Because the net stroke (NS) varies only little with the variation of the damping factors $D_{up}$ and $D_{down}$, the iteration on the net stroke (NS) is done first. Once the net stroke (NS) has converged, the iteration on the dual damping factors $D_{up}$ and $D_{down}$ begins.

The process 300 in FIG. 7A begins by performing some initial calculations (Block 302). An initial net stroke ($NS_0$) and top of stroke (TOS) are selected. This allows a daily production rate (Q) and a hydraulic horsepower ($H_{hyd}$) to be computed. The damping factors $D_{up}$ and $D_{down}$ are then set to initial values, e.g., $D_{up}$ is set to 0.25 and $D_{down}$ is set to 0.5. This selection can be based on empirical data or other factors.

Having these initial values, a number of subsequent calculations are performed (Block 304). In particular, the surface data is computed to produce an initial downhole pump card based on the set damping factors ($D_{up}$ and $D_{down}$) and the guessed net stroke ($NS_0$) and top of stroke (TOS). From the downhole pump card, the actual fluid load lines ($F0_{up}$actual, $F0_{down}$actual) and the net stroke (NS) are obtained, and the fluid level (FL), and new upstroke and downstroke damping factors ($D_{up}$ and $D_{down}$) are calculated from a bifurcated form of equation (2).

At this point after initial assumptions have been corrected and new damping factors ($D_{up}$ and $D_{down}$) calculated, a check is made to determine if the calculated net stroke (NS) is within a given tolerance to the guessed nest stroke ($NS_0$). In particular, the process 300 determines whether the absolute value of the difference between the guessed net stroke ($NS_0$) and the calculated net stroke (NS) is within a tolerance C, which as previously noted may vary depending on the implementation (Decision 306). If the calculated net stroke (NS) has converged, the process 300 proceeds to iterating on the dual damping factors ($D_{up}$ and $D_{down}$) to convergence (Block 312). Otherwise, the process 300 continues iterating on the net stroke (NS) until it converges (Block 308).

To continue iterating on the net stroke (NS), the process 300 calculates the daily production rate (Q), the hydraulic horsepower ($H_{hyd}$), the damping factors ($D_{up}$, $D_{down}$), and the downhole pump card again using the computed net stroke (NS) (Block 308). Again, a check is made whether the absolute value of the difference between the previous net stroke ($NS_{I-1}$) and the new net stroke ($NS_I$) is within tolerance E (Decision 310), and the process 300 either reverts back or proceeds on to iterating on the damping factors ($D_{up}$ and $D_{down}$).

To iterate on the damping factors ($D_{up}$ and $D_{down}$) once the net stroke (NS) has converged, the process 300 calculates s daily production rate (Q), a hydraulic horsepower ($H_{hyd}$), and the damping factors ($D_{up}$ and $D_{down}$) using the converged net stroke (NS) (Block 312). Then, the downhole pump card, the calculated fluid load lines ($F0_{up}$calc, $F0_{down}$calc), and the pump horsepower ($H_{pump}$) are computed (Block 312).

At this point, the process 300 enters a damping variation algorithm 350 (FIG. 7B) that compares the hydraulic horsepower ($H_{hyd}$) with the pump horsepower ($H_{pump}$) and adjusts the damping factors ($D_{up}$ and $D_{down}$) if necessary. If the comparison 350 is successful or the damping factors ($D_{up}$ and $D_{down}$) do not need adjustment, the process 200 exits successfully as computing the downhole pump card with proper damping factors ($D_{up}$ and $D_{down}$) (Block 316); otherwise, the process 300 again computes the downhole pump card (Block 314) so another iteration can be completed on the damping factors ($D_{up}$ and $D_{down}$).

Figure 7B:
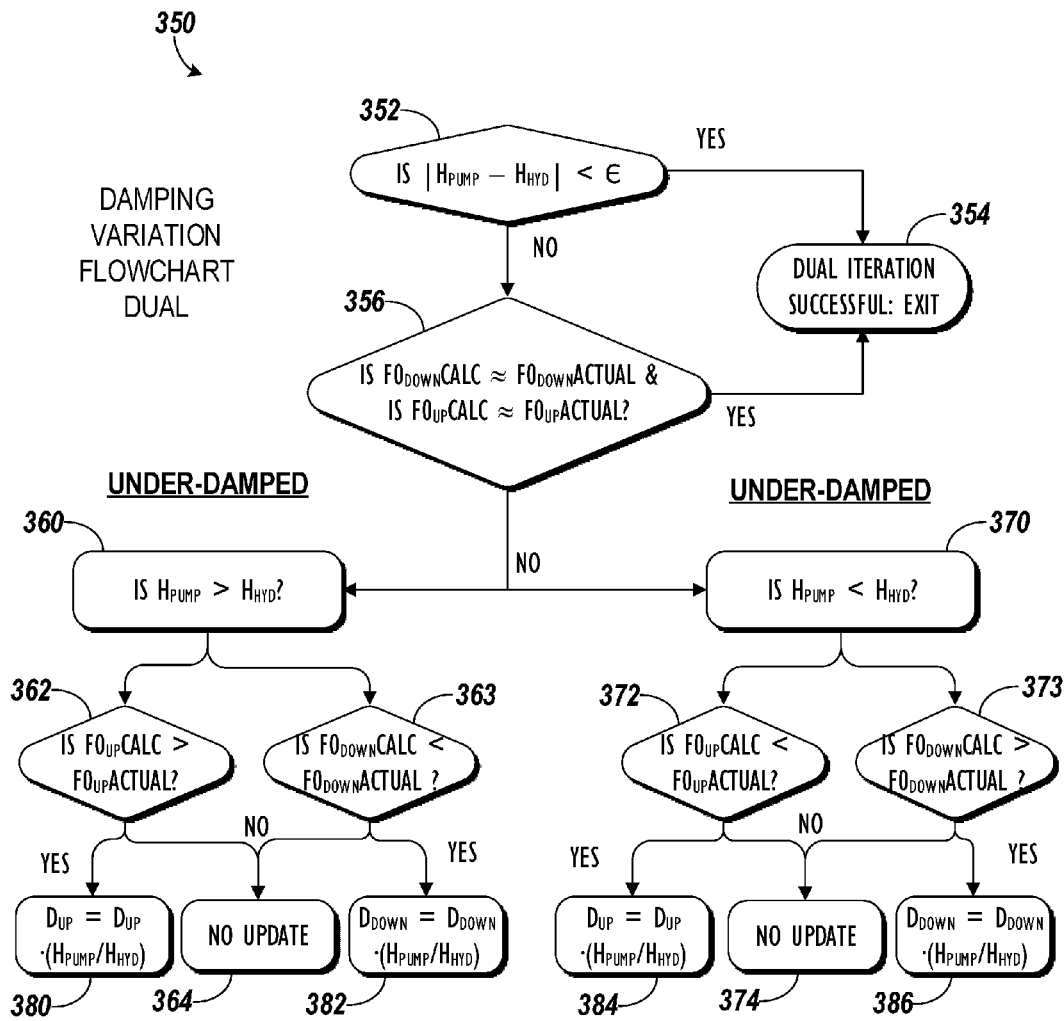
FIG. 7B is a flow chart for determining the damping variation for the iteration on the dual damping factors in FIG. 7A.

Turning to the damping variation algorithm in more detail, a comparative process 350 in FIG. 7B determines the damping variation for the iteration on the dual damping factors ($D_{up}$ and $D_{down}$) in FIG. 7A. This comparative process 350 serves as a test of the concavity of the fluid load lines, which indicates whether a given damping factor ($D_{up}$ and $D_{down}$) over damps or under damps.

Again, in the comparative process 350, the direction of the variation on the damping factor is determined by the sign of the difference between the pump horsepower ($H_{pump}$) and the hydraulic horsepower ($H_{hyd}$). If the pump horsepower ($H_{pump}$) is greater than the hydraulic horsepower ($H_{hyd}$), the data is deemed to be under-damped. Consequently, the damping factors $D_{up}$ and $D_{down}$ need to be increased. Similarly, if the pump horsepower ($H_{pump}$) is less than the hydraulic horsepower ($H_{HYD}$), the data is deemed to be over-damped, and the damping factors $D_{up}$ and $D_{down}$ need to be decreased.

Similar to the iteration on the single damping factor, the absolute value of the difference between the pump horsepower ($H_{pump}$) and the hydraulic horsepower ($H_{hyd}$) is monitored closely. Ideally, the pump horsepower ($H_{pump}$) should equal the hydraulic horsepower ($H_{hyd}$). Therefore, the difference between the pump horsepower ($H_{pump}$) and the hydraulic horsepower is determined. If that difference is less than a certain tolerance, the damping factors ($D_{up}$ and $D_{down}$) are assumed to be correct, and the iteration on the damping factors ($D_{up}$ and $D_{down}$) is considered to be converged.

Moreover, if the pump horsepower ($H_{pump}$) and the hydraulic horsepower ($H_{hyd}$) are not within the set tolerance, and if the pump horsepower ($H_{pump}$) is greater than the hydraulic horsepower ($H_{hyd}$), this is assumed to mean there is not enough damping when solving the wave equation. Similarly, if the pump horsepower ($H_{pump}$) is less than the hydraulic horsepower ($H_{hyd}$), it is assumed that there is too much damping when solving the wave equation.

Ideally, the graphical representation of the upstroke and the downstroke should be horizontal lines. If the downhole card is concave, too much damping has been used when solving the one-dimensional damped wave equation. Similarly, if the downhole card is convex, too little damping has been used when solving the one-dimensional damped wave equation.

To determine the required change in the damping factors $D_{up}$ and $D_{down}$, the comparative process 350 in FIG. 7B initially determines whether the pump horsepower ($H_{pump}$) is within tolerance of the hydraulic horsepower ($H_{hyd}$) (Decision 352). If so, the iteration is successful and exits (Block 354) because the iteration on the damping factors $D_{up}$ and $D_{down}$) is converged. If not, the process 350 continues with a secondary comparison (Decision 356).

In the event that the pump horsepower ($H_{pump}$) and the hydraulic horsepower ($H_{hyd}$) are not within tolerance and the damping needs to be adjusted, a second set of tests is set in place (Decision 356). These tests compare the statistical distributions of the upstroke points and the downstroke points to the computed values of the actual fluid load lines so the concavity of the upstroke and downstroke lines is tested.

Here, the process 350 determines whether the calculated downstroke fluid load lines ($F0_{down}$calc) is within a given range of the actual downstroke fluid load lines ($F0_{down}$actual) and whether the calculated upstroke fluid load line ($F0_{up}$calc) is within range of the actual upstroke fluid load line ($F0_{up}$actual). If both of these are true, the iteration is successful and exits (Block 354) because no adjustment of the damping factors $D_{up}$ and $D_{down}$ is essentially needed. If not, then the process 350 proceeds to one stage (Block 360) or another stage (Block 370) depending on whether the pump horsepower ($H_{pump}$) is greater than the hydraulic horsepower ($H_{hyd}$) or not.

As noted above, the actual fluid load lines are determined by using the first and second derivatives of the position. The set of actual fluid load lines called $F0_{up}$actual and $F0_{down}$actual are calculated by finding the right hand corners of the downhole card. The upstroke actual fluid load line $F0_{up}$actual is calculated as the load corresponding to the top of stroke. The top of stroke is computed by finding the zero of the first derivative of the downhole position data. To compute the downstroke actual fluid load line $F0_{down}$actual, the location of the transfer point is calculated, which is the point at which the load is transferred from the traveling valve to the standing valve. The transfer point is computed using a pump fillage calculation. The actual fluid load line $F0_{down}$actual is taken to be the load of the absolute minimum of the second derivative of the downhole position data after the transfer point, i.e. the lower right corner of the downhole card.

As also noted above, the set of calculated fluid load lines ($F0_{up}$calc and $F0_{down}$calc) are calculated using statistics or other technique as disclosed herein. The upstroke and downstroke data is statistically ordered by load in order to produce a probability density function. The maximums of the probability functions yield a set of load ranges in which most of the upstroke and downstroke data reside. The maximum of the probability density function for the upstroke data is referred to as the calculated fluid load line ($F0_{up}$calc) while the maximum of the probability density function for the downstroke data is referred to as the calculated fluid load line ($F0_{down}$calc).

When comparing the position of these fluid load lines, it becomes possible to determine how little or how much damping is needed. Therefore, the fluid load line calculation and concavity test is made part of the convergence criteria as detailed below.

If the pump horsepower ($H_{pump}$) is greater than the hydraulic horsepower ($H_{HYD}$) indicative of under-damping (Block 360), two separated analyses are made: (1) Is the calculated upstroke fluid load line ($F0_{up}$calc) greater than the actual upstroke fluid load line ($F0_{up}$actual)? and (2) Is the calculated downstroke fluid load line ($F0_{down}$calc) less than the actual downstroke fluid load line ($F0_{down}$actual)? (Decision 362) If either is true, then the process 350 updates the requisite damping factor ($D_{up}$ or $D_{down}$) (Block 380 or 382). If not, no update is necessary (Block 364).

Similarly, if the pump horsepower ($H_{pump}$) is less than the hydraulic horsepower ($H_{hyd}$) (Block 370), two separate analyses are made: (1) Is the calculated upstroke fluid load line ($F0_{up}$calc) less than the actual upstroke fluid load line ($F0_{up}$actual)? and (2) Is the calculated downstroke fluid load line ($F0_{down}$calc) greater than the actual downstroke fluid load line ($F0_{down}$actual)? (Decision 372). If either is true, then the process 350 updates the requisite damping factor $D_{up}$ or $D_{down}$ (Block 384 or 386). If not, no update is necessary (Block 374).

As shown here, the update of the requisite damping factors $D_{up}$ or $D_{down}$ are based on a ratio of the pump horsepower ($H_{pump}$) to the hydraulic horsepower ($H_{hyd}$), which scales the previous value used for the damping factor $D_{up}$ or $D_{down}$ in calculating the downhole pump card.

Results of the iteration on the damping factors are presented in FIGS. 8A through 8J. The results show downhole cards comparing iterations on a single damping factor D and iterations on dual damping factors $D_{up}$ and $D_{down}$ on example well data. The results for the single and dual damping factors are also compared with results from the Delta program available in the prior art, which uses the Gibbs' method as coded in LOWIS™ software (Life of Well Information Software), which is a web-based well management program available from Weatherford International.

In the top left corner of the FIGS. 8A through 8J, the downhole card resulting from the iteration on the dual damping factors $D_{up}$ and $D_{down}$ is depicted. In the right hand side, the downhole card resulting from the iteration on the single damping factor D is depicted. Finally, on the lower left side, the downhole card resulting from the Delta program is depicted. All of the downhole cards presented as results have been shifted to the zero line to offer a better comparison between the methods.

As further shown on the bottom right corner, details about the iterations are presented. These details for the iteration on the dual damping factors include the actual and calculated fluid load lines, the polished rod horsepower, the hydraulic horsepower, the pump horsepower, the damping factors $D_{up}$ and $D_{down}$ as well as the number of iterations. For the iteration on the single damping factor D, the details include the polished rod horsepower, the hydraulic horsepower, the pump horsepower, the damping factor as well as the number of iterations.

As also depicted, a set of two numbers is presented for the number of iterations. The first number is the number of iterations for the iteration on the net stroke, while the second number is the number of iterations for the damping factor(s). The computer code for the iteration on the net stroke is identical for both methods.

Because the damping factors are values designed to remove and add "noise" to the wave equation, the range for a damping factor is from 0 to 1. As a precaution, the damping factors are corrected so that they do not exceed the value 1 or go below 0. Therefore, a limit value for each end of the range is set in place with $D_{max}$=0.99 and $D_{min}$=0.01.

For the examples presented, the numerical value for the damping used for the Delta program is not comparable to the damping used for the modified Everitt-Jennings algorithm. This is so because the damping used for the Delta program is computed using rod information provided by the rod manufacturers and requires manual adjustment.

Figure 8A:
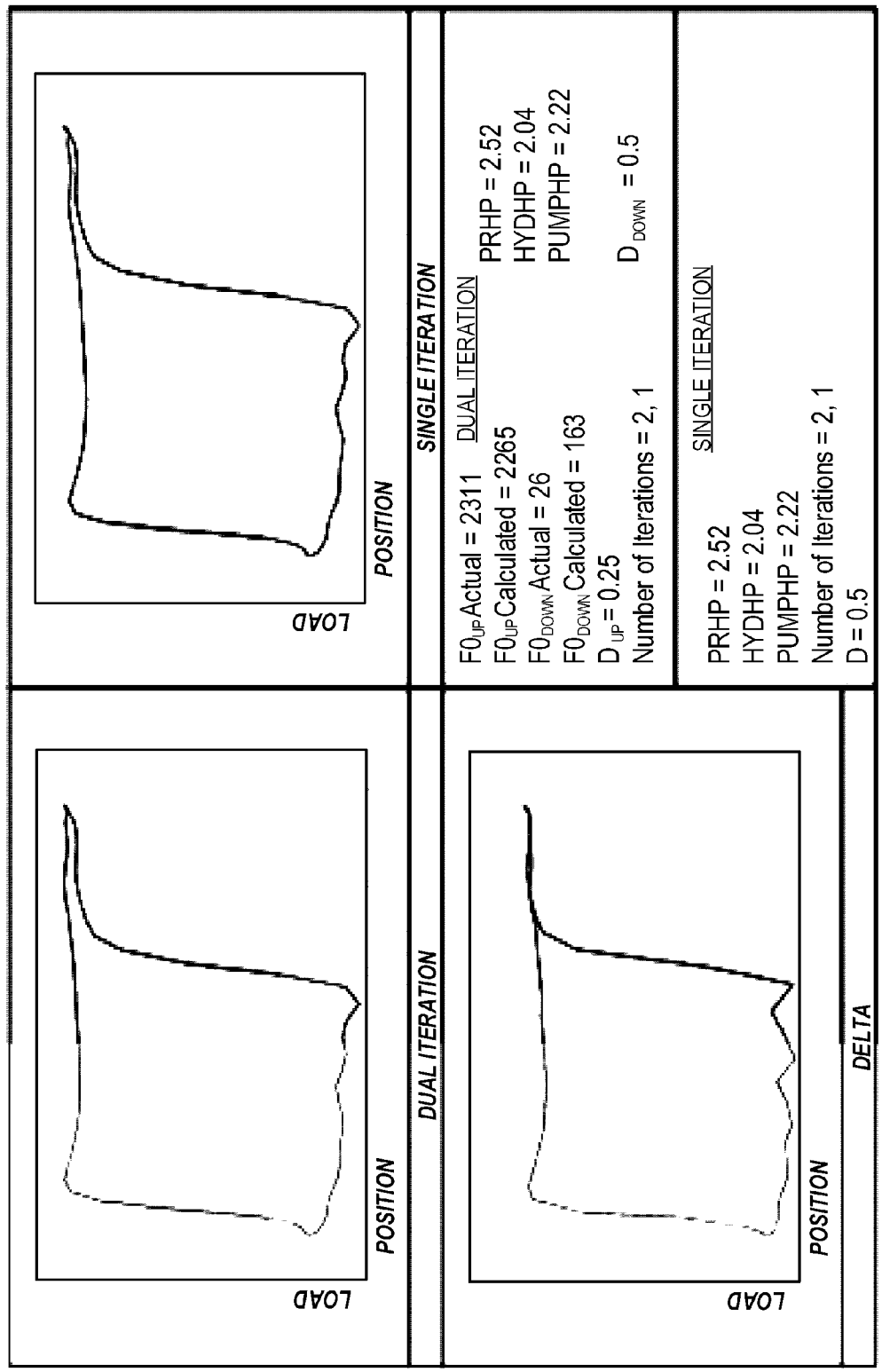
FIGS. 8A through 8J show comparisons of iterating on single and dual damping factors on a number of data examples.

In the first example depicted in FIG. 8A, a well has an original stroke length of 100 inches. The iteration on the net stroke converged in 2 iterations to a value of 61.78 inches. The polished rod horsepower is 2.52 hp, while the hydraulic horsepower is 2.04 hp. For both the iterations on the dual damping factors and the single damping factor, the pump horsepower is 2.22 hp. The $F0_{up}$actual and $F0_{down}$actual are 2311 and 26 lbs respectively, while the $F0_{up}$calc and $F0_{down}$calc are 2265 and 163 lbs respectively.

The iteration on the dual damping factors exited after only 1 iteration, since the $F0_{up}$actual>$F0_{up}$calc and the $F0_{down}$actual<$F0_{down}$calc, even though $|H_{pump}-H_{hyd}|>0.1$. The corresponding damping factors are $D_{up}$=0.25 and $D_{down}$=0.5. The iteration on the single damping factor also stopped at the first iteration since the $H_{pump}>H_{hyd}$, with a damping factor of 0.5. The card obtained through the Delta program shows over-damping.

Figure 8B:
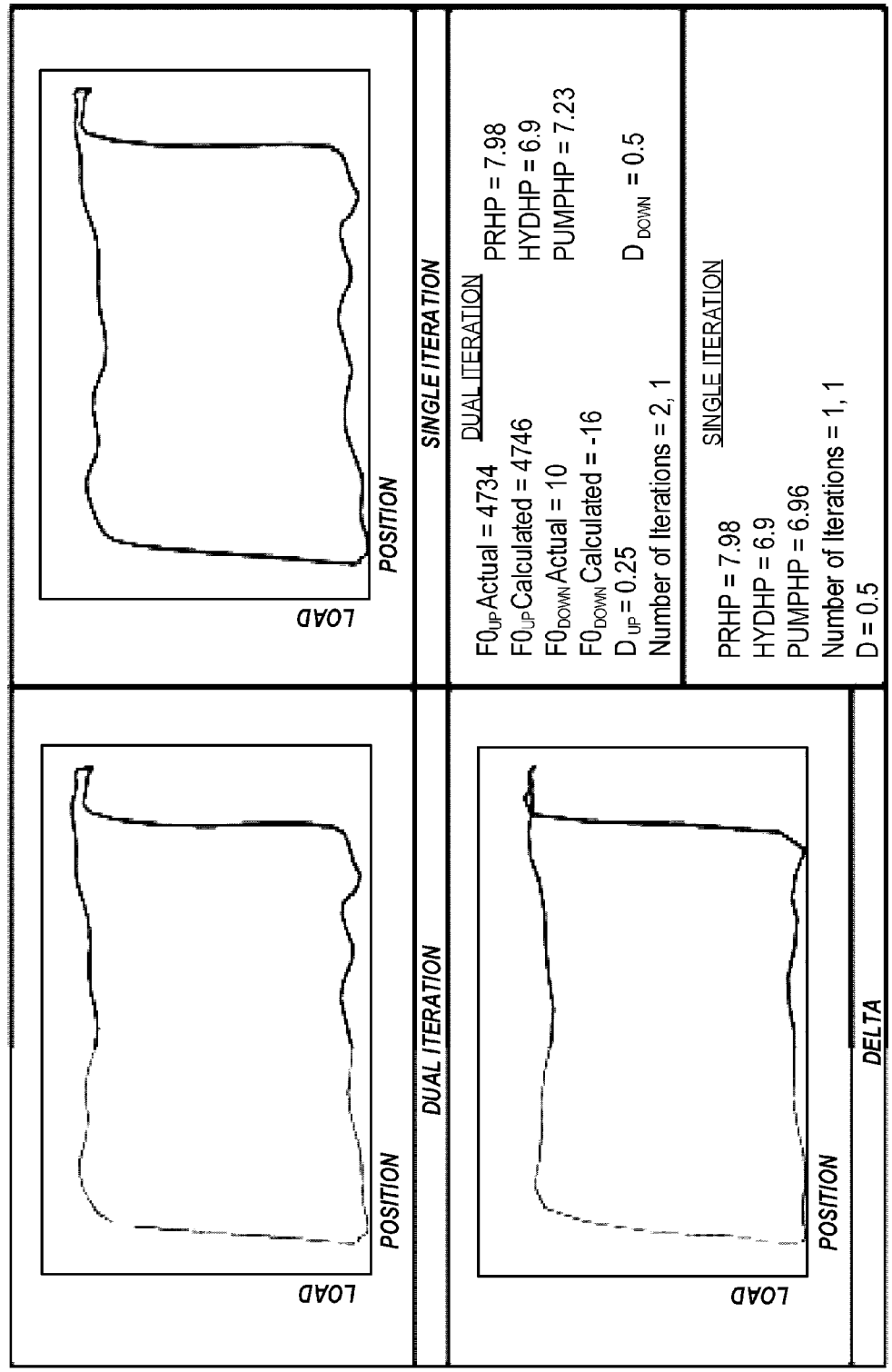

In the second example depicted in FIG. 8B, another well has original stroke length of 144.05 inches. The iteration on the net stroke converged in 2 iterations to a value of 119.44 inches. The polished rod horsepower is 7.98 hp, while the hydraulic horsepower is 6.9 hp. For the dual iteration on the damping factors, the pump horsepower is 7.23 hp, while for the single iteration on the damping factor, the pump horsepower 6.96 hp. The $F0_{up}$actual and $F0_{down}$actual are 4734 and 10 lbs respectively, while the $F0_{up}$calc and $F0_{down}$calc are 4746 and −16 lbs respectively.

The iteration on the dual damping factors exited after 1 iteration since $H_{pump}>H_{hyd}$ and the $F0_{up}$actual and $F0_{down}$actual are within tolerance of the values for the $F0_{up}$calc and $F0_{down}$calc. The corresponding damping factors are 0.25 and 0.5.

The iteration on the single damping factor also exited in 1 iteration since $H_{pump}>H_{hyd}$, resulting in a damping factor of 0.5. The card obtained through the Delta program displays a loop on the right hand side.

Figure 8C:
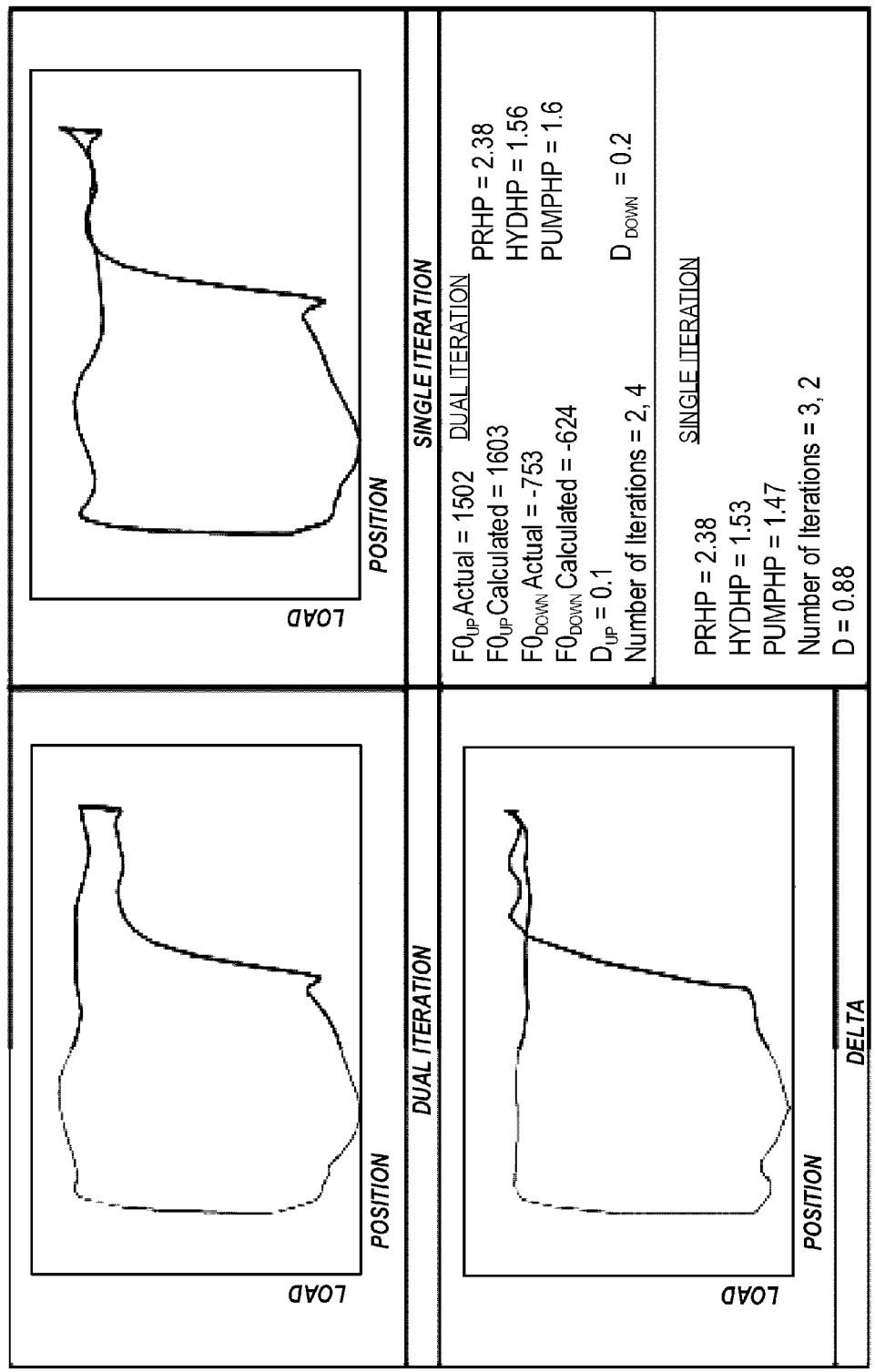

In the third example depicted in FIG. 8C, a third well has an original stroke length for the well is 64.00 inches. The iteration on the net stroke converged in 2 iterations to a value of 37.56 inches. The polished rod horsepower is 2.38 hp, while the hydraulic horsepower is 1.56 hp. For the iteration on the dual damping factors, the pump horsepower is 1.6 hp, while for the single iteration on the damping factor the pump horsepower is 1.47 hp. The $F0_{up}$actual and $F0_{down}$actual are 1502 and −753 lbs respectively, while the $F0_{up}$calc and $F0_{down}$calc are 1603 and −624 lbs respectively.

The iteration on the dual damping factor converged in 4 iterations, with $|H_{pump}-H_{hyd}|<0.1$ with damping factors $D_{up}$ and $D_{down}$ equal to 0.1 and 0.2 respectively. Moreover, the actual fluid load lines are within tolerance of the calculated fluid load lines, which further confirms that the appropriate damping factors were selected.

For the iteration on the single damping factor, the iteration converged after 2 iterations with a damping factor of 0.88. However from the presented downhole card, the card is clearly over-damped. The downhole card obtained through the Delta program also displays a "loop".

Figure 8D:
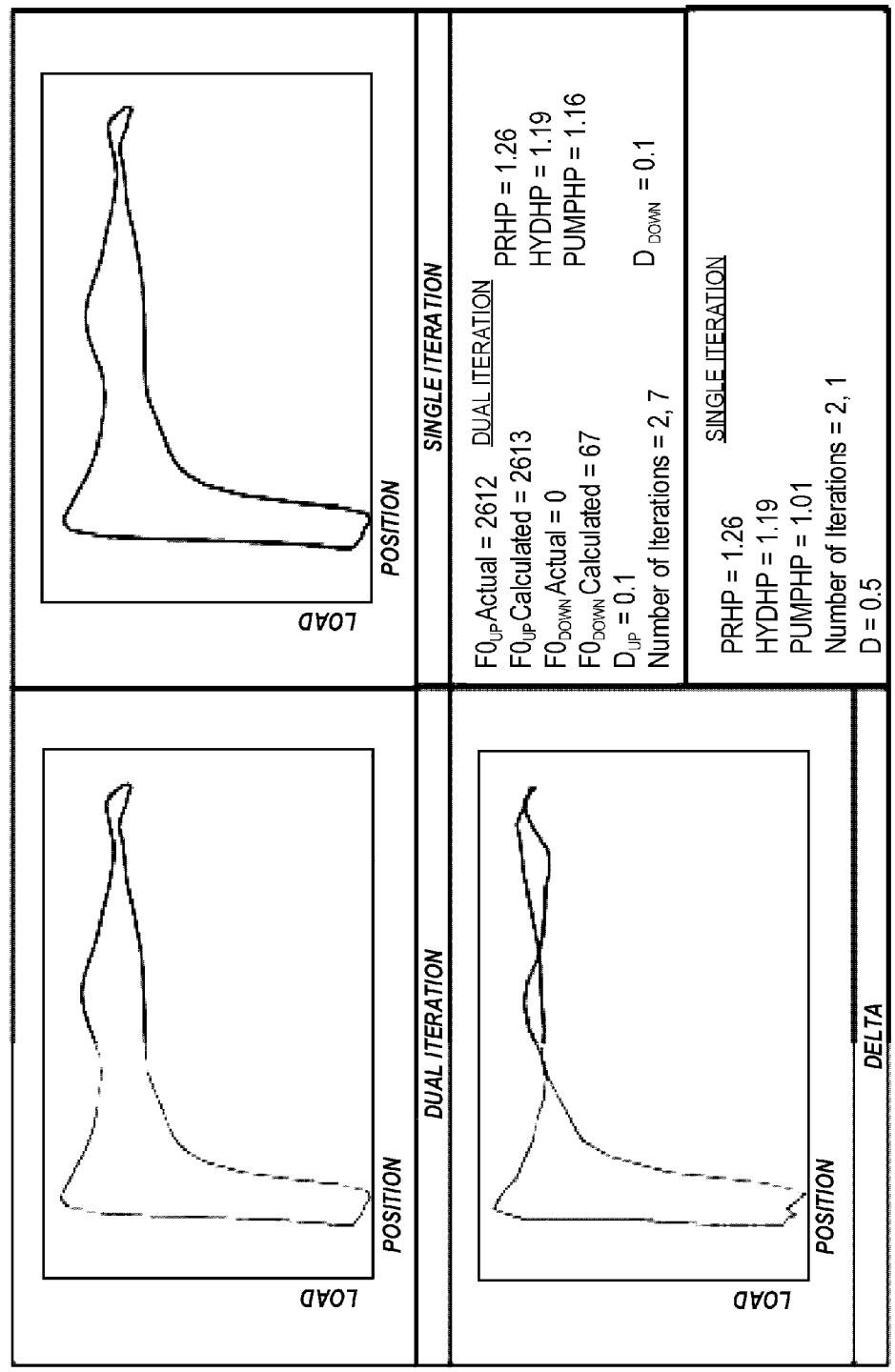

In the fourth example depicted in FIG. 8D, a fourth well has an original stroke length for the well is 86.3 inches. The iteration on the net stroke converged in 2 iterations to a value of 10.06 inches. The polished rod horsepower is 1.26 hp, while the hydraulic horsepower is 1.19 hp. For the iteration on the dual damping factors the pump horsepower is 1.16 hp, while for the iteration on the single damping factor, the pump horsepower is 1.01 hp. The actual fluid load lines are 2612 and 0 lbs, while the calculated fluid load lines are 2613 and 67 lbs.

The iteration of the dual damping factors converged in 7 iterations satisfying $|H_{pump}-H_{hyd}|<0.1$ with damping factors $D_{up}=0.1$ and $D_{down}=0.5$. For this example the values for the actual fluid load lines are within tolerance of the values for the calculated fluid load lines.

The iteration on the single damping factor converged in 1 iteration also satisfying $|H_{pump}-H_{hyd}|<0.1$ with a damping factor of 0.5. The downhole card obtained with the Delta program shows a "loop", suggesting over-damping.

Figure 8E:
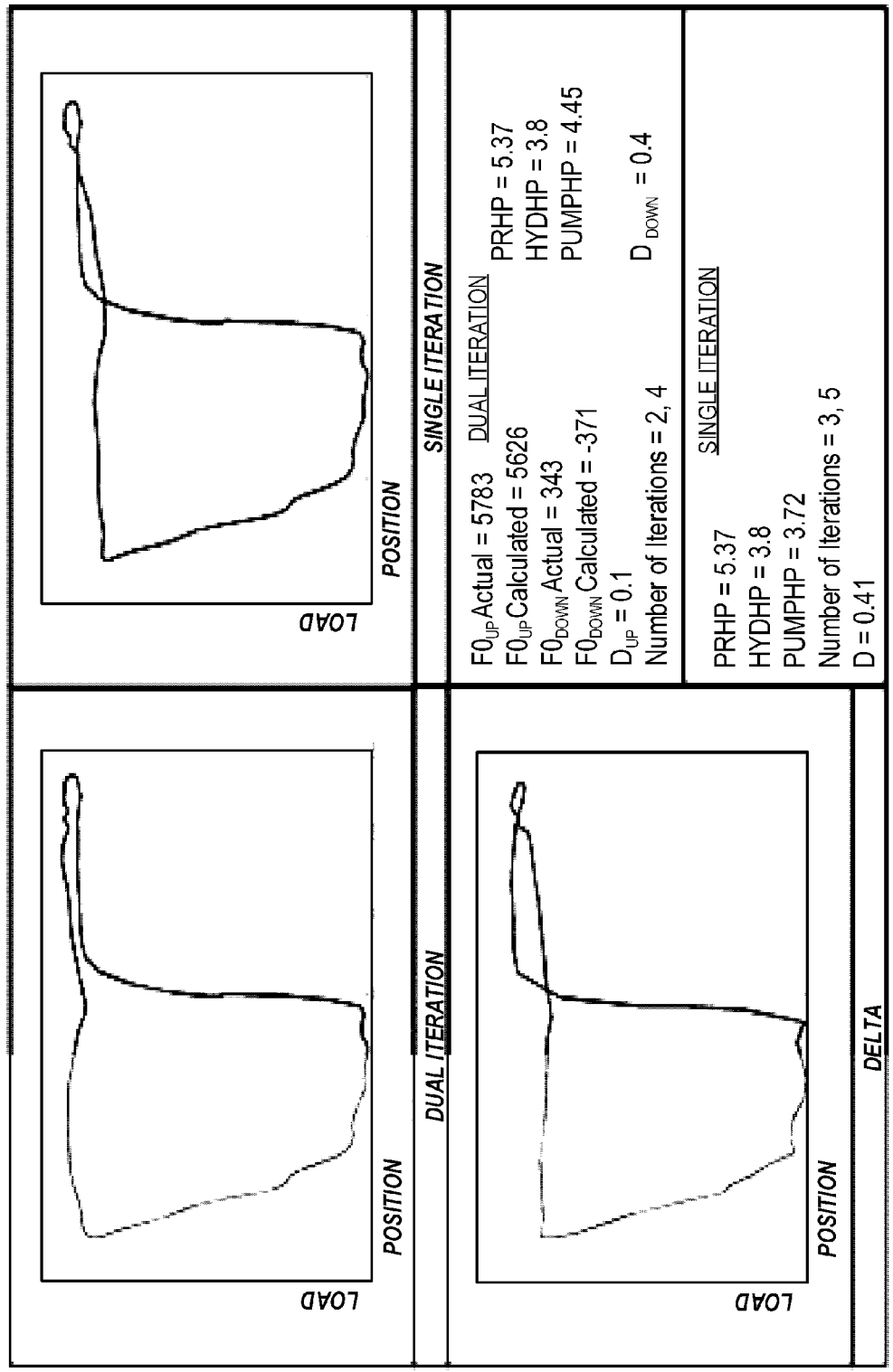

In the fifth example depicted in FIG. 8E, a fifth well has an original stroke length for the well is 123.2 inches. The iteration on the net stroke converged in 2 iterations to a value of 59.84 inches. The polished rod horsepower is 5.37 hp while the hydraulic horsepower is 3.8 hp. For the dual iteration on the damping factors, the pump horsepower is 4.45 hp while for the single iteration on the damping factor, the pump horsepower is 3.72 hp. The values for the actual fluid load lines are 5783 and 343 lbs respectively, while the values for the calculated fluid load lines are 5626 and −371 lbs.

The dual iteration on the damping factors exited after 4 iterations even though $|H_{pump}-H_{hyd}|>0.1$ since $F0_{up}$actual$>F0_{up}$calc and $F0_{down}$actual$>F0_{down}$calc with damping factors equal to 0.1 and 0.4 respectively.

For the single iteration on the damping factor, the algorithm converged in 5 iterations satisfying $|H_{pump}-H_{hyd}|<0.1$ with a damping factor of 0.41. Both downhole cards from the modified Everitt-Jennings with single iteration on damping factor and the downhole card obtained through the Delta program show a "loop".

Figure 8F:
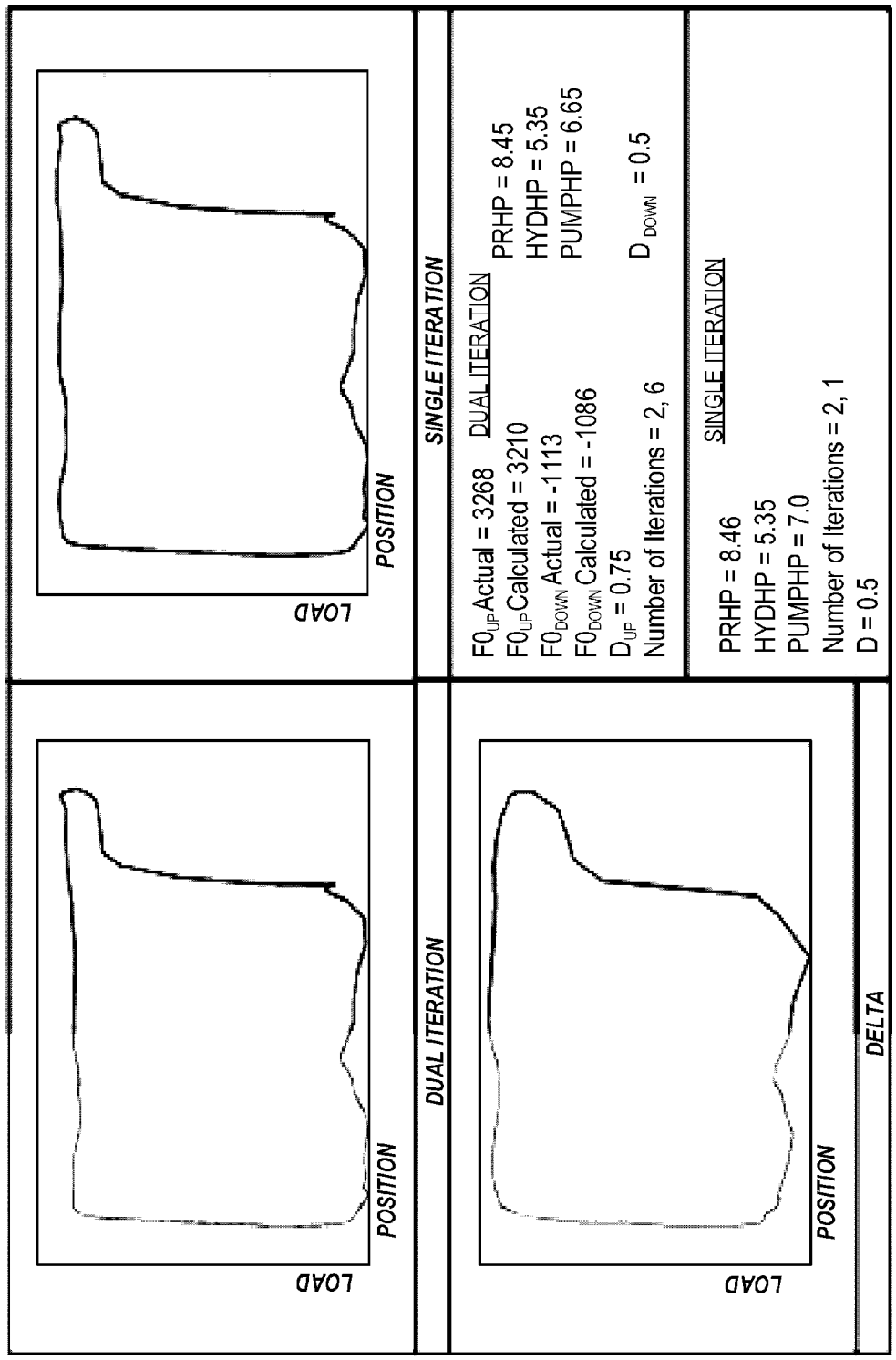

In the sixth example depicted in FIG. 8F, a well has an original stroke length for the well is 120.00 inches. The iteration on the net stroke converged in 2 iterations to a value of 85.21 inches. The polished rod horsepower is 8.45 hp, while the hydraulic horsepower is 5.35 hp. For the dual iteration on the damping factor, the pump horsepower is 6.65 hp, while for the single iteration on the damping factor, the pump horsepower is 7.0 hp. The $F0_{up}$actual and $F0_{down}$actual are 3268 and −1113 lbs respectively, while the $F0_{up}$calc and $F0_{down}$calc are 3210 and −1086 lbs respectively.

The dual iteration on the damping factors exited in 6 iterations with $H_{pump}>H_{hyd}$, $F0_{up}$actual$\approx F0_{up}$calc and $F0_{down}$actual$<F0_{down}$calc. The corresponding damping factors are $D_{up}=0.75$ and $D_{down}=0.5$.

For the single iteration on the damping factor, the algorithm exited after 1 iteration since $H_{pump}>H_{hyd}$ with a damping factor of 0.5. The downhole card associated with the Delta program show under-damping.

Figure 8G:
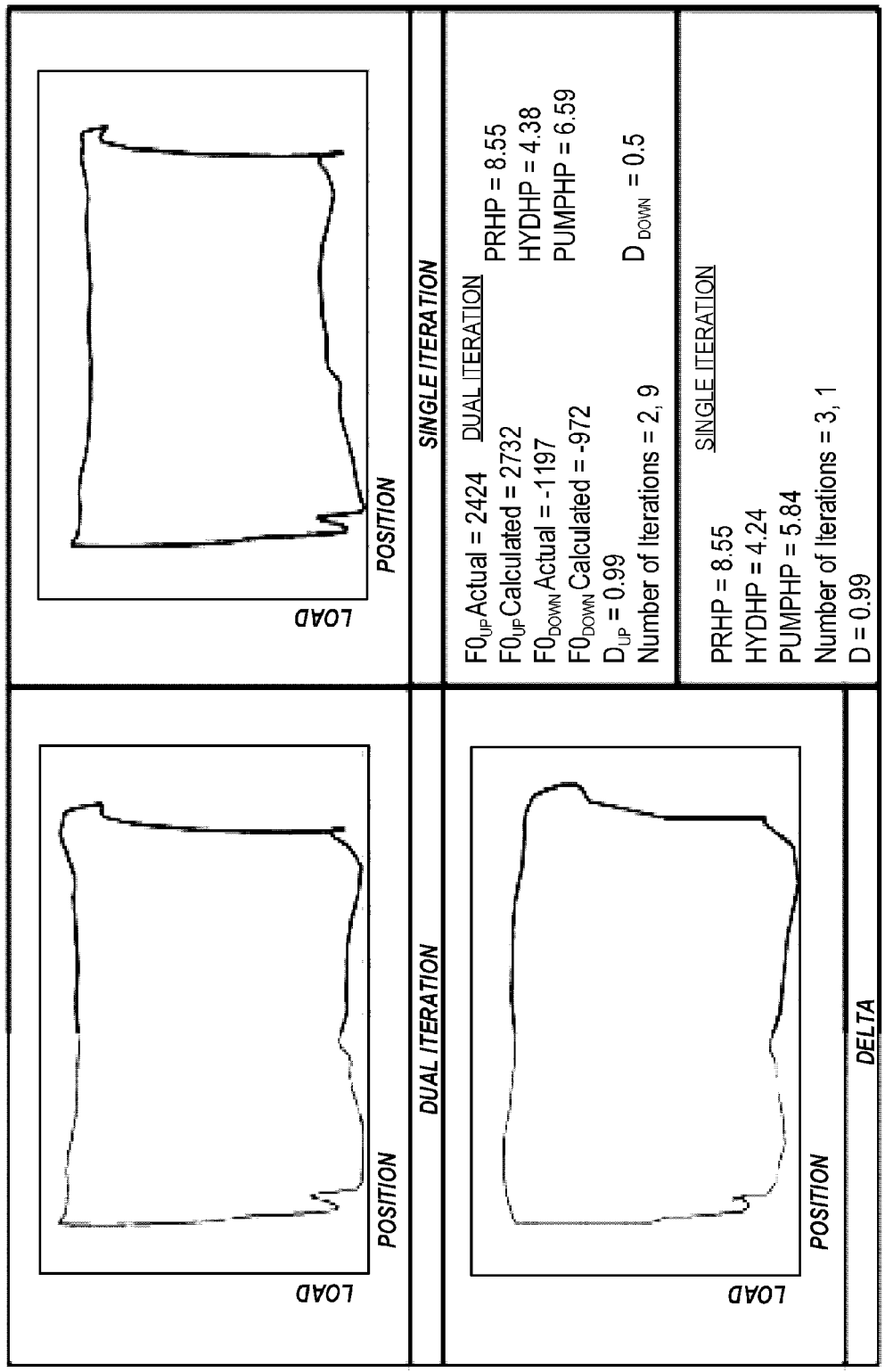

In seventh example depicted in FIG. 8G, a well has an original stroke length for the well is 86.1 inches. The iteration on the net stroke converged in 2 iterations to a value of 75.91 inches. The polished rod horsepower is 8.55 hp, while the hydraulic horsepower is 4.38 hp. For the dual iteration on the damping factors, the pump horsepower is 6.59 hp while for the single iteration on the damping factor, the pump horsepower is 5.84 hp. The values for the actual fluid load lines are 2424 and −1197 lbs respectively, while the values for the calculated fluid load lines are 2732 and −972 lbs respectively.

The iteration on the dual damping factors exited after 9 iterations since $H_{pump}>H_{h}yd$, $F0_{up}$actual$<F0_{up}$calc but $D_{up}=D_{max}=0.99$ and $F0_{down}$actual$<F0_{down}$calc. The corresponding damping factors are $D_{up}=0.99$ and $D_{down}=0.5$. For the iteration on the single damping factor, the algorithm exited after 1 iteration since $H_{pump}>H_{hyd}$ with a damping factor of 0.99. The associated downhole card, however shows over-damping. The downhole card associated with the Delta program shows under-damping.

Figure 8H:
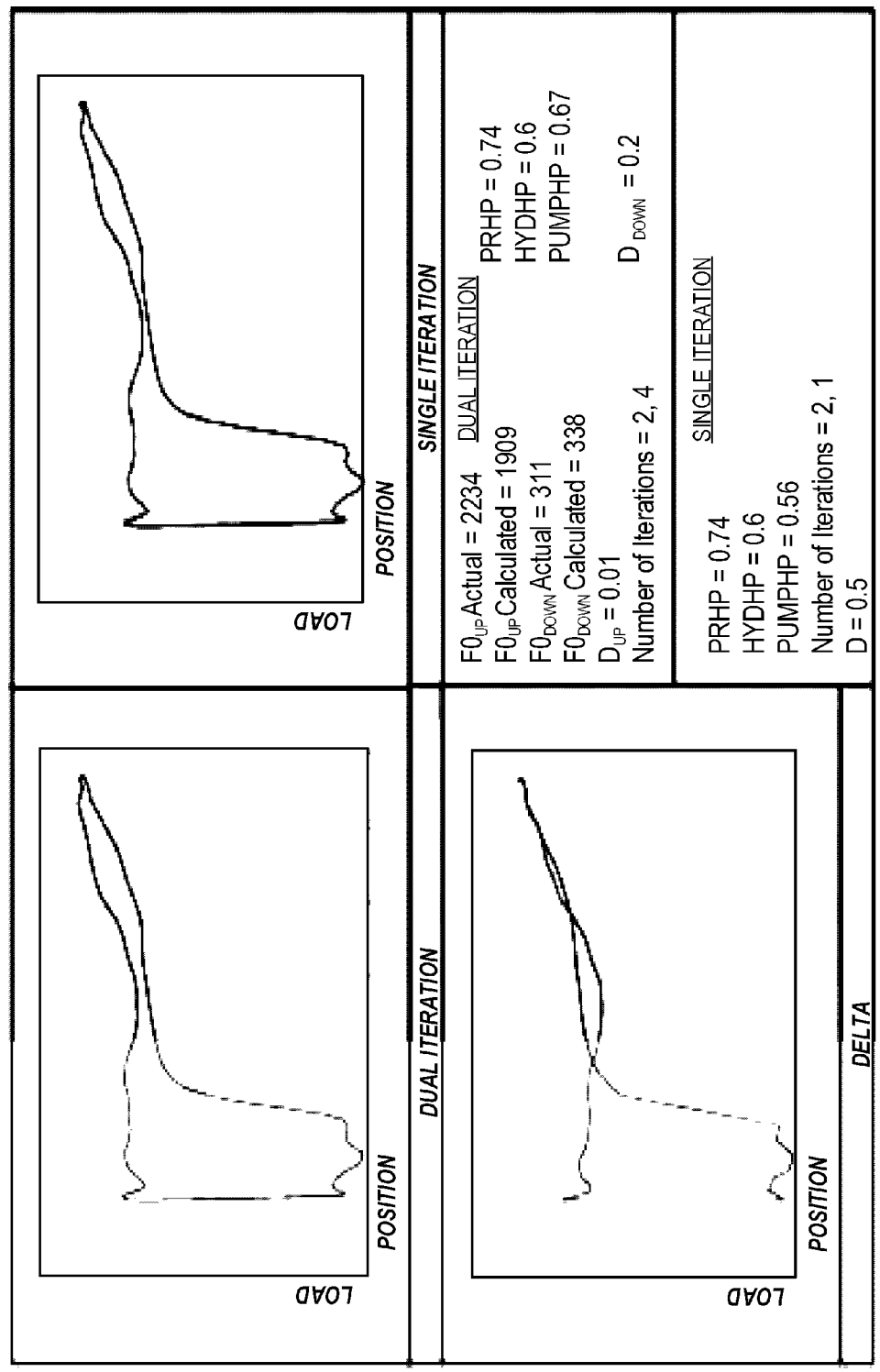

In the eighth example depicted in FIG. 8H, a well has an original stroke length of 57.10 inches. The iteration on the net stroke converged in 2 iterations to a value of 13.05 inches. The polished rod horsepower is 0.74 hp, while the hydraulic horsepower is 0.6 hp. For the iteration on the dual damping factors the pump horsepower is 0.67 hp, while for the iteration on the single damping factor the pump horsepower is 0.56 hp. The values for the actual fluid load lines are 2234 and 311 lbs respectively, while the values for the calculated fluid load lines are 1909 and 338 lbs respectively.

The iteration on the dual damping factors converged in 4 iterations with $|H_{pump}-H_{hyd}|<0.1$ with damping factors of $D_{up}=0.01$ and $D_{down}=0.2$. Furthermore $F0_{up}$actual$>F0_{up}$calc and $F0_{down}$actual $F0_{down}$calc. The iteration on the single damping factor converged in 1 iteration to a damping factor of 0.99. The downhole card obtained through the Delta program shows over-damping.

Figure 8I:
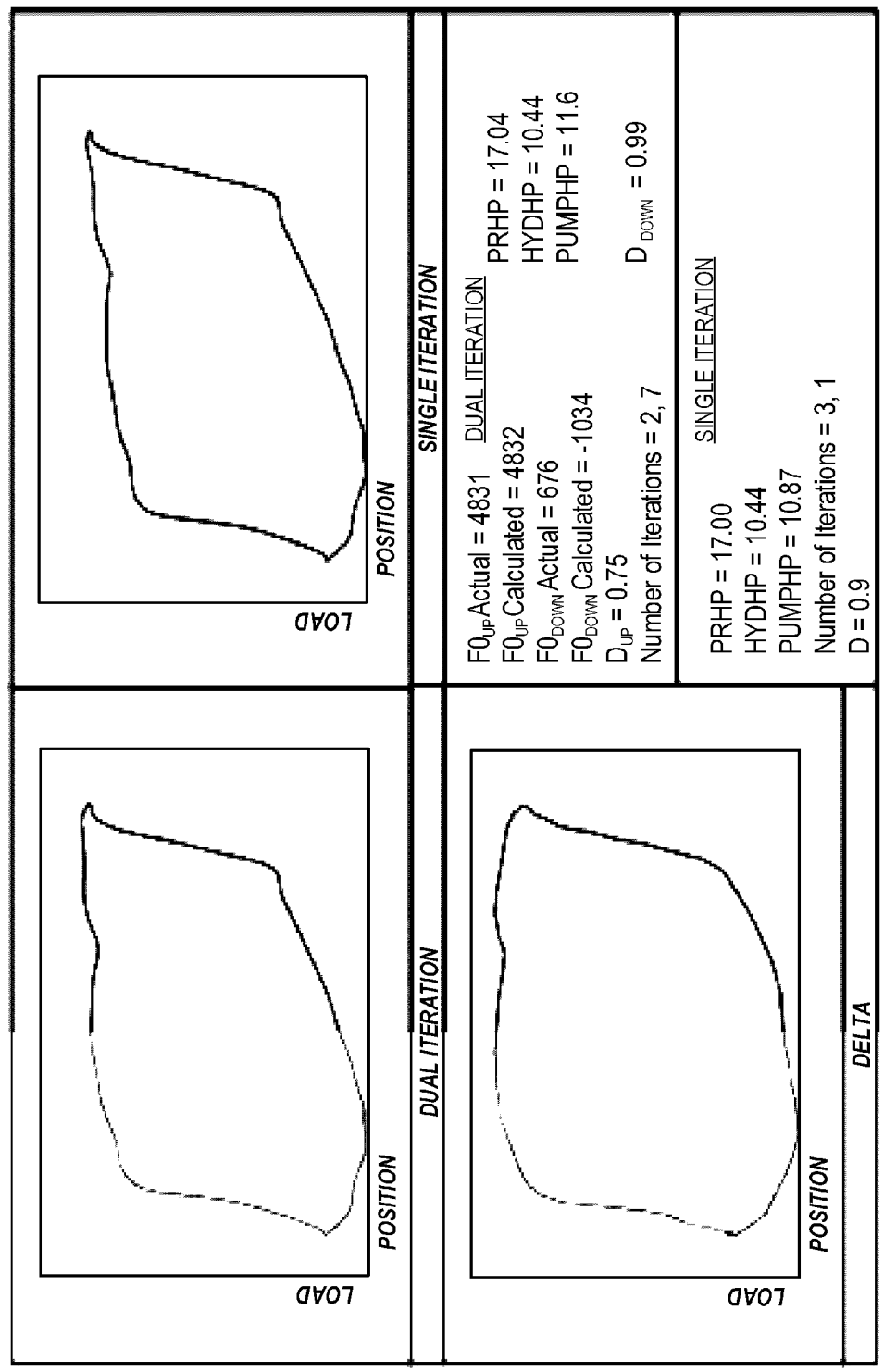

In a ninth example depicted in FIG. 8I, a well has an original stroke length of 119.90 inches. The iteration on the net stroke converged in 2 iterations to a value of 95.92 inches. The polished rod horsepower is 17.04 hp, while the hydraulic horsepower is 10.44 hp. For the dual iteration on the damping factors the pump horsepower is 11.6 hp, while for the single iteration on the damping factor the pump horsepower is 10.87 hp. The values for the actual fluid load lines are 4831 and 676 lbs respectively, while the values for the calculated fluid load lines are 4832 and −1034 lbs respectively.

The dual iteration on the damping factors exited after 7 iterations with $F0_{up}$actual$\approx F0_{up}$calc and $D_{up}=0.75$, while $F0_{down}$actual$>F0_{down}$calc with $D_{down}=D_{max}=0.99$ even though $H_{pump}>H_{hyd}$.

For the single iteration on the damping factor, the algorithm exited after 1 iteration since $H_{pump}>H_{hyd}$ with a damping factor of 0.9. The downhole card associated with the Delta program shows under-damping.

Figure 8J:
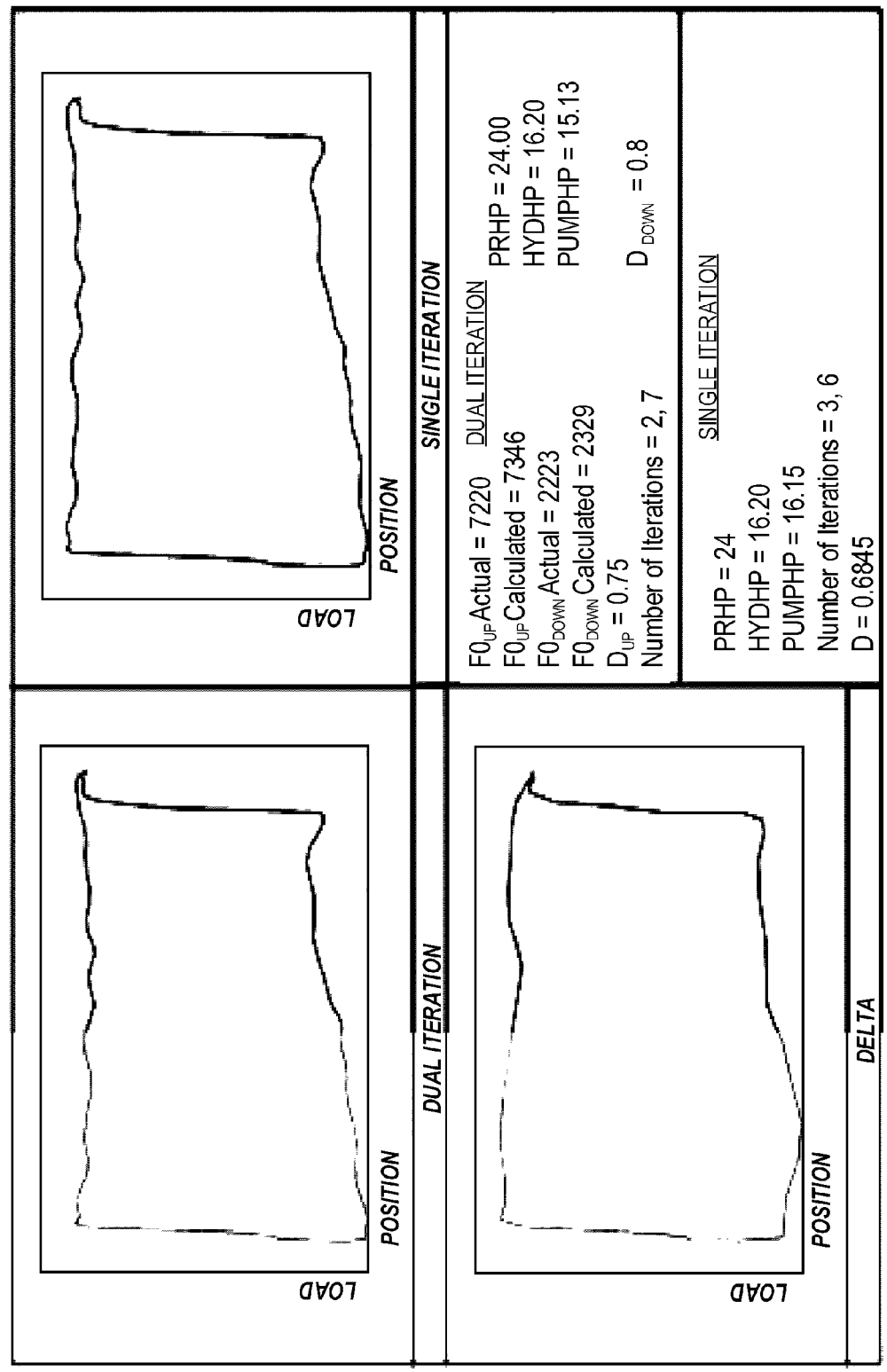

In the tenth example depicted in FIG. 8J, a well has an original stroke length of 144.00 inches. The iteration on the net stroke converged in 2 iterations to a value of 123.33 inches. The polished rod horsepower is 24.00 hp, while the hydraulic horsepower is 16.20 hp. For the dual iteration on the damping factors the pump horsepower is 15.13 hp, while for the single iteration on the damping factor the pump horsepower is 16.15 hp. The values for the actual fluid load lines are 7220 and 2223 lbs. respectively, while the values for the calculated fluid load lines are 7346 and 2329 lbs. respectively.

For the iteration on the dual damping factors, the algorithm exited after 7 iterations with $F0_{up}$actual<$F0_{up}$calc, $F0_{down}$actual<$F0_{down}$calc and $H_{pump}$<$H_{hyd}$ with damping factor values of 0.75 and 0.8 respectively.

For the iteration on the single damping factor, the algorithm converged in 6 iterations with a damping factor of 0.6845 to satisfy $|H_{pump}-H_{hyd}|<0.1$. The downhole card associated with the Delta program suggests under-damping.

For the examples in FIGS. 8A, 8B, 8D, 8H and 8I, the results from the iteration on the dual damping factors and the single damping factor are very similar. Indeed, for both methods, the downhole cards show appropriate damping. However, on these examples, the downhole card obtained through the Delta program shows inappropriate damping. In FIG. 8I, for example, the downhole card obtained through the Delta program displays not enough damping as seen by the "fat" appearance of the card, whereas for examples in FIGS. 8A, 8B, 8D and 8H, the downhole card obtained through the Delta programs shows too much damping since the cards loop over themselves.

For the examples in FIGS. 8C and 8E, the results from the dual iteration on the damping factors and the single iteration on the damping factor are different. In both cases, the single iteration on the damping converged; however, the damping factors are not appropriate since the downhole cards loop on themselves. The same "looping" phenomenon is also observed for the downhole cards obtained through the Delta program, which is a sign of over-damping. For both examples, the dual iteration on the damping factors did not converge through the horsepower test but rather through testing the concavity of the fluid load lines according to the present disclosure.

For the examples in 8F, 8G and 8J, each downhole card obtained through all three methods vary in "thickness". Even though for each example, it appears that the downhole card obtained through the dual and single iterations show more appropriate damping than for the "fatter" Delta card, it is hard to determine which damping is most accurate. Some of the above examples clearly come from wells with mechanical friction, which can complicate the selection of the damping, since the viscous damping is not meant to overcome the mechanical friction. Accordingly, additional techniques can be used, such as disclosed in co-pending application Ser. No. 13/663,161, which is incorporated herein by reference in its entirety.

Handling the damping of the one-dimensional damped wave equation can be done using a single damping factor or by using both an upstroke damping factor and a downstroke damping factor. As can be seen by the above results, in most instances, the difference between the results of both methods may be small. However, in some instances, the single iteration on the damping factor is not enough to overcome the downhole conditions present in the well so that iterating on the single damping factors selects, even upon convergence, an inappropriate damping factor.

Consistently, however, the results from either iterations on damping prove better than the calculation of the damping factor as present in the Delta program. The damping factors in the Delta program must be manually adjusted to match the results from the dual iteration on the damping factors or the single iteration on the damping factor. Moreover, the addition of the fluid load line calculations and concavity tests improve the results and the speed of convergence of the algorithm.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure.

Figure 9A:
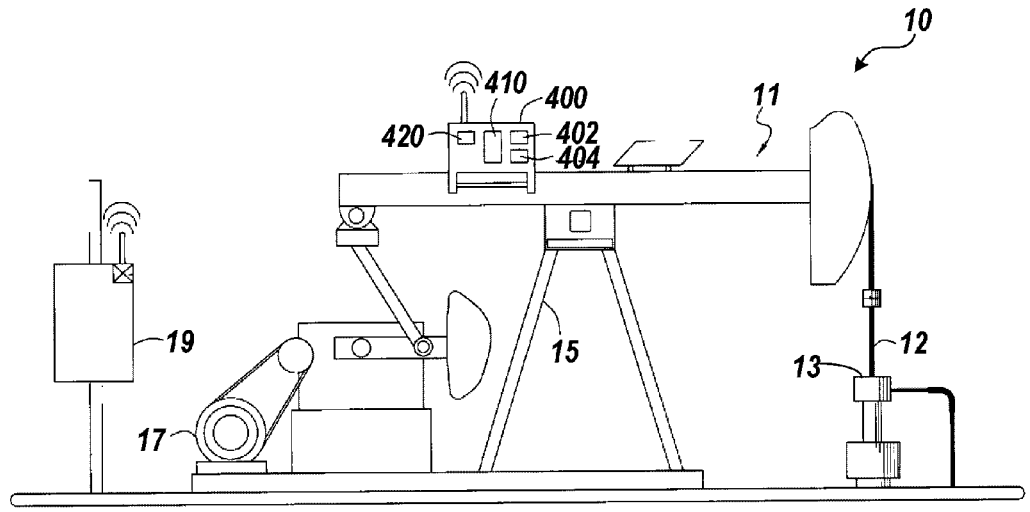
FIG. 9A illustrates a pump controller according the present disclosure for a sucker rod pump system.

To that end, the teachings of the present disclosure can be implemented in a remote processing device or a pump controller. For example, FIG. 9A shows an embodiment of a pump controller 400 installed on a sucker-rod pump system 10, such as a pump jack commonly used to produce fluid from a well. The pump system 10 includes a walking beam 11 connected to a frame 15. The walking beam 11 operatively connects to a polished rod 12 connected via a rod string (not shown) to a downhole pump (not shown), which can be any downhole reciprocating pump as discussed herein. A motor control panel 19 controls a motor 17 to move the walking beam 11 and reciprocate the polished rod 12, which in turn operates the downhole pump. Although a pump jack is shown, other sucker-rod pump systems can be used, such as a strap jack, or any other system that reciprocates a rod string using cables, belts, chains, and hydraulic and pneumatic power systems.

In general, sensors 402 and 404 measure load and position data of the pump system 10 at the surface, and the measured data from the sensors 402 and 404 is relayed to the controller 400. After processing the information, the controller 400 sends signals to the motor control panel 19 to operate the pump system 10. A particular arrangement of controller 400 and sensors 402 and 404 is disclosed in U.S. Pat. No. 7,032,659, which is incorporated herein by reference.

As shown, the controller 400 uses a load sensor 402 to detect the weight of the fluid in the production tubing during operation of the pump system 10 and uses a position sensor 404 to measure the position of the pump system 10 over each cycle of stroke. The position sensor 404 can be any position measurement device used for measuring position relative to the top or bottom of the stroke. For example, the position sensor 404 can be a dual position sensor that produces a continuous position measurement and a discrete switch output that closes and opens at preset positions of the polished rod 12.

Alternatively, the degree of rotation of the pump system's crank arm can provide displacement data. For example, a sensor can determine when the system's crank arm passes a specific location, and a pattern of simulated polished rod displacement versus time can be adjusted to provide an estimate of polished rod positions at times between these crank arm indications. In another alternative, a degree of inclination of the walking beam 11 can provide displacement data. For example, a device can be attached to the walking beam 11 to measure the degree of inclination of the pumping unit.

Load data of the system 10 can be directly measured using a load cell inserted between a polished rod clamp and carrier bar. Alternatively, the strain on the walking beam 11 can provide the load data. Using a load sensor 402, for example, the controller 400 can measure the strain on the polished rod 12 and can then control the pump system 10 based on the strain measured. The load sensor 402 may use any of a variety of strain-measuring devices known to a person of ordinary skill in the art. For example, the load sensor 402 can be a load measurement device used on the pump system 10 that includes a load cell installed on the pumping rod 12 or mounted on the walking beam 11. The load sensor 402 can measure strain in the polished rod 12 and can use a strain-gage transducer welded to the top flange of the walking beam 11.

Alternatively, the load sensor 402 can be a strain measuring device that clamps on to a load-bearing surface of the walking beam 11 or any convenient location as disclosed in U.S. Pat. No. 5,423,224. In another example, the load sensor 402 can use an assembly similar to what is disclosed in U.S. Pat. No. 7,032,659, which is incorporated herein by reference in its entirety.

Finally, the amplitude and frequency of the electrical power signal applied to the motor 17 can be used to determine motor rotation (i.e. displacement data) and motor torque (i.e. load data). In this way, the motor speed and the displacement of the polished rod can provide a series of motor speed and displacement data pairs at a plurality of displacements along the polished rod. That displacement data which represents a complete stroke of the pump system 10 can then be converted to load on the rod string and displacement of the rod string at a plurality of displacements along the polished rod, as described in U.S. Pat. No. 4,490,094.

Figure 9B:
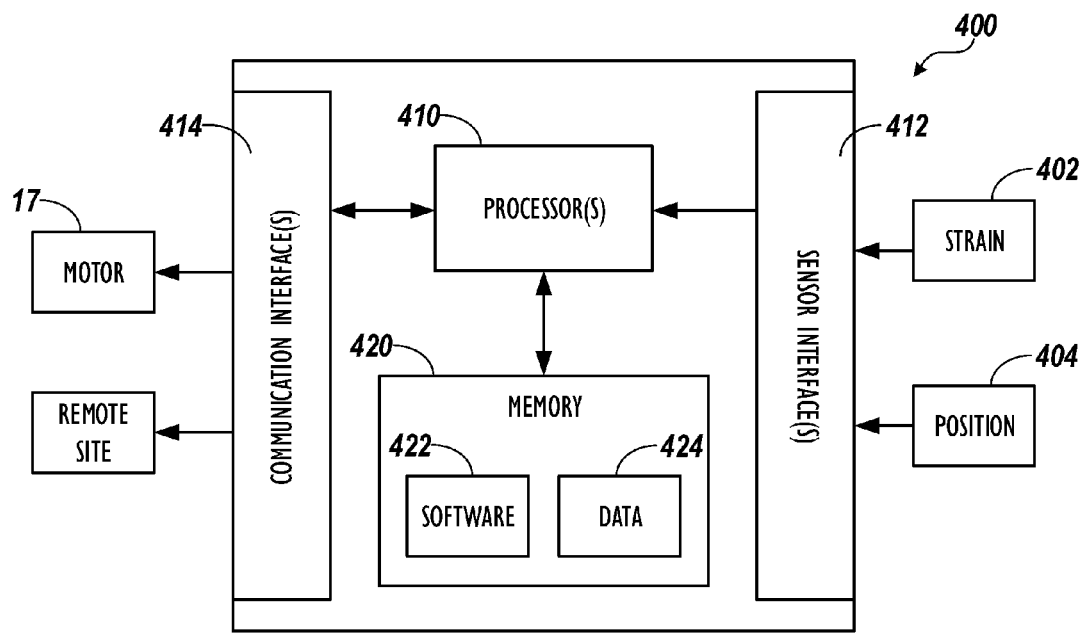
FIG. 9B illustrates a schematic of the pump controller for controlling/diagnosing the sucker rod pump system according to the present disclosure.

Details of the pump controller 400 are schematically shown in FIG. 9B. In general, the controller 400 includes one or more sensor interfaces 412 receiving measurements from the load and position sensors 402 and 404. Additional inputs of the controller 400 can connect to other devices, such as an infrared water-cut meter, an acoustic sounding device (ASD) provide real-time data which can be logged for pressure buildup analysis and real-time calibration for fluid-level control. The controller 400 also include a power system (not shown), as conventionally provided.

The controller 400 can have software 422 and data 424 stored in memory 420. The memory 420 can be a battery-backed volatile memory or a non-volatile memory, such as a one-time programmable memory or a flash memory. Further, the memory 420 may be any combination of suitable external and internal memories.

The software 422 can include motor control software and pump diagnostic software, and the data 424 stored can be the measurements logged from the various load and position sensors 402 and 404 and calculation results. The data 424 in the memory 420 stores characteristics of the well, including the depth, azimuth, and inclination of points along the well, which can be derived from drilling and survey data. Because the rod string may be tapered as is sometimes the case, the data 424 in the memory 420 can also store characteristics of the sucker rods taper, such as depth, diameter, weight, and length of various sections of the rod.

A processing unit 410 having one or more processors then processes the measurements by storing the measurement as data 424 in the memory 420 and by running the software 422 to make various calculations as detailed herein. For example, the processing unit 410 obtains outputs from the surface sensors, such as the load and position measurements from then sensors 402 and 404. In turn, the processing unit 410 correlates the output from the load sensor 402 to the position of the polished rod 12 and determines the load experienced by the polished rod 12 during the stroke cycles.

Using the software 412, the processing unit 410 then calculates the downhole card indicative of the load and position of the downhole pump.

To control the pump system 10, the pump controller 400 preferably uses an unabbreviated Everitt-Jennings algorithm with finite differences to solve the wave equation. The controller 400 calculates pump fillage and optimizes production on each stroke. This information is used to minimize fluid pounding by stopping or slowing down the pump system 10 at the assigned pump fillage setting. The pump controller 400 can also analyze the downhole pump card and determine potential problems associated with the pump and its operation. This is so because the shape, pattern, and other features associated with the downhole pump card represents various conditions of the pump and its operation.

After processing the measurements, the controller 400 sends signals to the motor control panel 19 to operate the pump system 10. For example, one or more communication interfaces 414 communicate with the motor control panel 19 to control operation of the pump system 10, such as shutting off the motor 17 to prevent pump-off, etc. The communication interfaces 414 can be capable of suitable forms of communications, and they may also communicate data and calculation results to a remote site using any appropriate communication method.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method implemented by a processing device of diagnosing a pump apparatus having a downhole pump disposed in a wellbore and having a motor at a surface of the wellbore, the downhole pump reciprocated in the wellbore by a rod string operatively moved by the motor, the method comprising:

generating downhole pump data having values indicative of downhole load and downhole position of the downhole pump by using surface measurements and a wave equation model having an upstroke damping factor and a downstroke damping factor;

determining, in a first determination, a first set of actual fluid load lines for actual fluid loads of each of an upstroke and a downstroke of the downhole pump from the values of the downhole pump data, the actual fluid load lines being additional to the values of the downhole pump data;

determining, in a second determination different from the first determination, a second set of calculated fluid load lines for calculated fluid loads of each of the upstroke and the downstroke of the downhole pump from the values of the downhole pump data, the calculated fluid load lines being additional to the values of the downhole pump data and to the actual fluid load lines;

assessing damping used to generate the downhole pump data by comparing the first set of actual fluid load lines to the second set of calculated fluid load lines;

adjusting at least one of the upstroke and the downstroke damping factors of the wave equation model based on the comparison; and generating additional downhole pump data based on the upstroke and the downstroke damping factors, at least one of which is adjusted.

2. The method of claim 1, comprising initially obtaining the surface measurements indicative of surface load and surface position of the rod string at the surface.

3. The method of claim 2, wherein obtaining the surface measurements comprises measuring the surface load and the surface position of the rod string at the surface.

4. The method of claim 2, wherein obtaining the surface measurements comprises obtaining the surface measurement from memory.

5. The method of claim 1, wherein determining, in the first determination, the actual fluid load line in the first set for the upstroke of the downhole pump from the values of the downhole pump data comprises calculating a zero of a first derivative of the downhole position in the upstroke of the downhole pump data.

6. The method of claim 1, wherein determining, in the first determination, the actual fluid load line in the first set for the downstroke of the downhole pump from the values of the downhole pump data comprises calculating a concave up point after a transfer point in the downstroke of the downhole pump data.

7. The method of claim 6, wherein calculating the concave up point comprises calculating an absolute minimum of a second derivative of the downhole position after the transfer point in the downstroke of the downhole pump data.

8. The method of claim 1, wherein determining, in the second determination different from the first determination, the second set of calculated fluid load lines for each of the upstroke and the downstroke of the downhole pump from the values of the downhole pump data comprises calculating the second set of calculated fluid load lines statistically for upstroke load values and downstroke load values.

9. The method of claim 1, wherein assessing the damping used to generate the downhole pump data by comparing the first set of actual fluid load lines to the second set of calculated fluid load lines comprises determining that the downhole pump data is over-damped or under-damped.

10. The method of claim 9, wherein determining that the downhole pump data is over-damped or under-damped comprises determining the downhole pump data is over-damped by determining at least that (a) the upstroke calculated fluid load line of the second set is less than the upstroke actual fluid load line of the first set, (b) the downstroke calculated fluid load line of the second set is greater than the downstroke actual fluid load line of the first set; or (c) both (a) and (b).

11. The method of claim 9, wherein determining that the downhole pump data is over-damped or under-damped comprises determining the downhole pump data is under-damped by determining at least that (a) the upstroke calculated fluid load line of the second set is greater than the upstroke actual fluid load line of the first set, (b) the downstroke calculated fluid load line of the second set is less than the downstroke actual fluid load line of the first set; or (c) both (a) and (b).

12. The method of claim 9, wherein determining that the downhole pump data is under-damped comprises determining that a pump horsepower is greater than a hydraulic horsepower.

13. The method of claim 12, wherein determining that the downhole pump data is under-damped at least for the upstroke damping factor comprises determining that the upstroke calculated fluid load line of the second set is greater than the upstroke actual fluid load line of the first set.

14. The method of claim 12, wherein determining that the downhole pump data is under-damped at least for the downstroke damping factor comprises determining that the downstroke calculated fluid load line of the second set is less than the downstroke actual fluid load line of the first set.

15. The method of claim 9, wherein determining that the downhole pump data is over-damped comprises determining that a pump horsepower is less than a hydraulic horsepower.

16. The method of claim 15, wherein determining that the downhole pump data is over-damped at least for the upstroke damping factor comprises determining that the upstroke calculated fluid load line of the second set is less than the upstroke actual fluid load line of the first set.

17. The method of claim 15, wherein determining that the downhole pump data is over-damped at least for the downstroke damping factor comprises determining that the downstroke calculated fluid load line of the second set is greater than the downstroke actual fluid load line of the first set.

18. The method of claim 1, wherein adjusting at least one the damping factors of the wave equation model based on the comparison comprises adjusting the at least one damping factor by a ratio of a pump horsepower to a hydraulic horsepower.

19. The method of claim 1, further comprising modifying at least one parameter of the pump apparatus based on the generated downhole pump data.

20. The method of claim 19, wherein modifying at least one parameter of the pump apparatus based on the generated downhole pump data comprises stopping the motor or adjusting a speed of the motor.

21. The method of claim 1, wherein the upstroke actual fluid load line of the first set is indicative of a top of stroke of the downhole pump, and wherein the downstroke actual fluid load line of the first set is indicative of a concave up point after transfer of the fluid load of the downhole pump.

22. The method of claim 1, wherein the upstroke calculated fluid load line of the second set is indicative of distribution of load values in the upstroke of the downhole pump data, and wherein the downstroke calculated fluid load line of the second set is indicative of distribution of load values in the downstroke of the downhole pump data.

23. A controller for a pump apparatus having a downhole pump disposed in a wellbore and having a motor at a surface of the wellbore, the downhole pump reciprocated in the wellbore by a rod string operatively moved by the motor, the controller comprising:

one or more interfaces obtaining surface measurements indicative of surface load and surface position of the rod string at the surface;

memory in communication with the one or more interfaces and storing a wave equation model having an upstroke damping factor and a downstroke damping factor; and a processing unit in communication with the one or more interfaces and the memory and configured to:

generate downhole pump data having values indicative of downhole load and downhole position of the downhole pump by using the surface measurements and the wave equation model, determine, in a first determination, a first set of actual fluid load lines for actual fluid loads of each of an upstroke and a downstroke of the downhole pump from the values of the downhole pump data, the actual fluid load lines being additional to the values of the downhole pump data;

determine, in a second determination different from the first determination, a second set of calculated fluid load line for calculated fluid loads of each of the upstroke and the downstroke of the downhole pump from the values of the downhole pump data, the calculated fluid load lines being additional to the values of the downhole pump data and to the actual fluid load lines;

compare the first set of actual fluid load lines to the second set of calculated fluid load lines to assess damping used to generate the downhole pump data, adjust at least one of the upstroke and the downstroke damping factors of the wave equation model based on the comparison, and generate additional downhole pump data based on the upstroke and the downstroke damping factors, at least one of which is adjusted.

24. The controller of claim 23, wherein the processing unit is configured to:

initially obtain the surface measurements indicative of surface load and surface position of the rod string at the surface; and measure the surface load and the surface position of the rod string at the surface, or obtain the surface measurement from memory.

25. The controller of claim 23, wherein to determine, in the first determination, the actual fluid load line in the first set for the upstroke of the downhole pump from the values of the downhole pump data, the processing unit is configured to calculate a zero of a first derivative of the downhole position in the upstroke of the downhole pump data; or wherein to determine, in the first determination, the actual fluid load line in the first set for the downstroke of the downhole pump from the values of the downhole pump data, the processing unit is configured to calculate a concave up point after a transfer point in the downstroke of the downhole pump data, or calculate an absolute minimum of a second derivative of the downhole position after the transfer point in the downstroke of the downhole pump data.

26. The controller of claim 23, wherein to determine, in the second determination different from the first determination, the second set of calculated fluid load line for the calculated fluid loads of each of the upstroke and the downstroke of the downhole pump from the load values distributed on the downhole pump data, the processing unit is configured to calculate the second set of calculated fluid load lines statistically for upstroke load values and downstroke load values.

27. The controller of claim 23, wherein to compare the first set of actual fluid load lines to the second set of calculated fluid load lines to assess the damping used to generate the downhole pump data, the processing unit is configured to determine that the downhole pump data is over-damped or under-damped.

28. The controller of claim 27, wherein to determine that the downhole pump data is over-damped or under-damped, the processing unit is configured to:

determine the downhole pump data is over-damped by determining at least that (a) the upstroke calculated fluid load line of the second set is less than the upstroke actual fluid load line of the first set, (b) the downstroke calculated fluid load line of the second set is greater than the downstroke actual fluid load line of the first set; or (c) both (a) and (b); or determine the downhole pump data is under-damped by determining at least that (a) the upstroke calculated fluid load line of the second set is greater than the upstroke actual fluid load line of the first set, (b) the downstroke calculated fluid load line of the second set is less than the downstroke actual fluid load line of the first set; or (c) both (a) and (b).

29. The controller of claim 27, wherein to determine that the downhole pump data is under-damped, the processing unit is configured to determine that a pump horsepower is greater than a hydraulic horsepower.

30. The controller of claim 29, wherein to determine that the downhole pump data is under-damped at least for the upstroke damping factor, the processing unit is configured to determine that the upstroke calculated fluid load line of the second set is greater than the upstroke actual fluid load line of the first set; or wherein to determine whether the downhole pump data is under-damped at least for the downstroke damping factor, the processing unit is configured to determine that the downstroke calculated fluid load line of the second set is less than the downstroke actual fluid load line of the first set.

31. The controller of claim 27, wherein to determine that the downhole pump data is over-damped, the processing unit is configured to determine that a pump horsepower is less than a hydraulic horsepower.

32. The controller of claim 31, wherein to determine that the downhole pump data is over-damped at least for the upstroke damping factor, the processing unit is configured to determine that the upstroke calculated fluid load line of the second set is less than the upstroke actual fluid load line of the first set; or wherein to determine that the downhole pump data is over-damped at least for the downstroke damping factor, the processing unit is configured to determine that the downstroke calculated fluid load line of the second set is greater than the downstroke actual fluid load line of the first set.

33. The controller of claim 23, wherein to adjust at least one the damping factors of the wave equation model based on the comparison, the processing unit is configured to adjust the at least one damping factor by a ratio of a pump horsepower to a hydraulic horsepower.

34. The controller of claim 23, wherein the processing unit is configured to modify at least one parameter of the pump apparatus based on the generated downhole pump data, stop the motor, or adjusting a speed of the motor.

35. A non-transitory program storage device having program instructions stored thereon for causing a programmable control device to perform a method of diagnosing a pump apparatus having a downhole pump disposed in a wellbore and having a motor at a surface of the wellbore, the downhole pump reciprocated in the wellbore by a rod string operatively moved by the motor, the method comprising:

generating downhole pump data having values indicative of downhole load and downhole position of the downhole pump by using surface measurements and a wave equation model having an upstroke damping factor and a downstroke damping factor;

determining, in a first determination, a first set of actual fluid load lines for actual fluid loads of each of an upstroke and a downstroke of the downhole pump from the values of the downhole pump data, the actual fluid load lines being additional to the values of the downhole pump data;

determining, in a second determination different from the first determination, a second set of calculated fluid load lines for calculated fluid loads of each of the upstroke and the downstroke of the downhole pump from the values of the downhole pump data, the calculated fluid load lines being additional to the values of the downhole pump data and to the actual fluid load lines;

assessing damping used to generate the downhole pump data by comparing the first set of actual fluid load lines to the second set of calculated fluid load lines;

adjusting at least one of the upstroke and the downstroke damping factors of the wave equation model based on the comparison; and generating additional downhole pump card based on the upstroke and the downstroke damping factors, at least one of which is adjusted.

36. The program storage device of claim 35, comprising:
initially obtaining the surface measurements indicative of surface load and surface position of the rod string at the surface; and
measuring the surface load and the surface position of the rod string at the surface, or obtaining the surface measurement from memory.

37. The program storage device of claim 35,
wherein determining, in the first determination, the actual fluid load line in the first set for the upstroke of the downhole pump from the values of the downhole pump data comprises calculating a zero of a first derivative of the downhole position in the upstroke of the downhole pump data; or
wherein determining, in the first determination, the actual fluid load line in the first set for the downstroke of the downhole pump from the values of the downhole pump data comprises calculating a concave up point after a transfer point in the downstroke of the downhole pump data, or calculating an absolute minimum of a second derivative of the downhole position after the transfer point in the downstroke of the downhole pump data.

38. The program storage device of claim 35, wherein determining, in the second determination different from the first determination, the second set of the calculated fluid load line for the calculated fluid loads of each of the upstroke and the downstroke of the downhole pump from the load values distributed on the downhole pump data comprises calculating the second set of calculated fluid load lines statistically for upstroke load values and downstroke load values.

39. The program storage device of claim 35, wherein assessing the damping used to generate the downhole pump data by comparing the first set of actual fluid load lines to the second set of calculated fluid load lines comprises determining that the downhole pump data is over-damped or under-damped.

40. The program storage device of claim 39, wherein determining that the downhole pump data is over-damped or under-damped comprises:
determining the downhole pump data is over-damped by determining at least that (a) the upstroke calculated fluid load line of the second set is less than the upstroke actual fluid load line of the first set, (b) the downstroke calculated fluid load line of the second set is greater than the downstroke actual fluid load line of the first set; or (c) both (a) and (b); or
determining the downhole pump data is under-damped by determining at least that (a) the upstroke calculated fluid load line of the second set is greater than the upstroke actual fluid load line of the first set, (b) the downstroke calculated fluid load line of the second set is less than the downstroke actual fluid load line of the first set; or (c) both (a) and (b).

41. The program storage device of claim 39, wherein
determining that the downhole pump data is under-damped comprises determining that a pump horsepower is greater than a hydraulic horsepower.

42. The program storage device of claim 41,
wherein determining that the downhole pump data is under-damped at least for the upstroke damping factor comprises determining that the upstroke calculated fluid load line of the second set is greater than the upstroke actual fluid load line of the first set; or
wherein determining that the downhole pump data is under-damped at least for the downstroke damping factor comprises determining that the downstroke calculated fluid load line of the second set is less than the downstroke actual fluid load line of the first set.

43. The program storage device of claim 39, wherein determining that the downhole pump data is over-damped comprises determining that a pump horsepower is less than a hydraulic horsepower.

44. The program storage device of claim 43,
wherein determining that the downhole pump data is over-damped at least for the upstroke damping factor comprises determining that the upstroke calculated fluid load line of the second set is less than the upstroke actual fluid load line of the first set; or
wherein determining that the downhole pump data is over-damped at least for the downstroke damping factor comprises determining that the downstroke calculated fluid load line of the second set is greater than the downstroke actual fluid load line of the first set.

45. The program storage device of claim 35, wherein adjusting at least one the damping factors of the wave equation model based on the comparison comprises adjusting the at least one damping factor by a ratio of a pump horsepower to a hydraulic horsepower.

46. The program storage device of claim 35, further comprising modifying at least one parameter of the pump apparatus based on the generated downhole pump data, stopping the motor, or adjusting a speed of the motor.

* * * * *